US012631138B2

(12) United States Patent
Watts-Farmer

(10) Patent No.: US 12,631,138 B2
(45) Date of Patent: May 19, 2026

(54) INTERNAL COMBUSTION ENGINE

(71) Applicant: Carnot Ltd, London (GB)

(72) Inventor: Archie Watts-Farmer, London (GB)

(73) Assignee: Carnot Ltd, London (GB)

( * ) Notice: Subject to any disclaimer, the term of this patent is extended or adjusted under 35 U.S.C. 154(b) by 0 days.

(21) Appl. No.: 18/245,581

(22) PCT Filed: Sep. 16, 2021

(86) PCT No.: PCT/GB2021/052412
§ 371 (c)(1),
(2) Date: Mar. 16, 2023

(87) PCT Pub. No.: WO2022/058736
PCT Pub. Date: Mar. 24, 2022

(65) Prior Publication Data

US 2023/0383693 A1 Nov. 30, 2023

(30) Foreign Application Priority Data

Sep. 16, 2020 (GB) ..................................... 2014614

(51) Int. Cl.
*F02B 75/28* (2006.01)
*F02F 1/18* (2006.01)
(Continued)

(52) U.S. Cl.
CPC ............ *F02B 75/282* (2013.01); *F02F 1/186* (2013.01); *F02F 3/0084* (2013.01); *F02F 3/18* (2013.01)

(58) Field of Classification Search
CPC ........... F02B 75/28; F02B 75/282; F02F 1/18; F02F 1/181; F02F 1/186; F02F 3/00; F02F 3/0084; F02F 3/18
(Continued)

(56) References Cited

U.S. PATENT DOCUMENTS 3,808,955 A 5/1974 Hamada et al.
4,548,254 A * 10/1985 Roberts .................. B23P 15/00 164/112

(Continued)

FOREIGN PATENT DOCUMENTS

CN 102444495 A 5/2012
CN 202451290 U 9/2012

(Continued)

OTHER PUBLICATIONS

International Preliminary Report on Patentability for PCT Application No. PCT/GB2021/052412 dated Mar. 30, 2023.

(Continued)

*Primary Examiner* — Logan M Kraft
*Assistant Examiner* — Johnny H Hoang
(74) *Attorney, Agent, or Firm* — Harness, Dickey & Pierce, P.L.C.

(57) ABSTRACT

A piston arrangement (12) for an internal combustion engine (10) comprises one or more pistons (14) which are at least partly constructed from a technical ceramic material. An axially disposed bore (20) for receiving a heat transfer member (22) is provided in at least one of the pistons (14). The heat transfer member (22) is reconfigurable from a first, solid, state to a second state in which at least part of the heat transfer member (22) is in a liquid state so as to transfer heat away from and thus cool the piston rod (16) as the piston reciprocates. A cylinder arrangement (46) for the internal combustion engine (10) comprises one or more cylinders (48) which are at least partly constructed from a technical ceramic material. One or more grooves (54) are formed in the cylinder (48), to decrease the thermal gradient between the inside and outside of the cylinder (48). A piston (14) for the internal combustion engine (10) comprises a piston rod (16) and a piston crown (18) which is at least partly
(Continued)

constructed from a technical ceramic material. An insulation arrangement (40) between the piston rod (16) and the piston crown (18) comprises segments (42) configured such that when disposed on the piston rod (16) axial slots or spaces are defined between the segments (42).

34 Claims, 13 Drawing Sheets

(51) Int. Cl.
*F02F 3/00* (2006.01)
*F02F 3/18* (2006.01)

(58) Field of Classification Search
USPC ......... 123/18 R, 51 A, 51 AA, 51 AC, 51 B, 123/51 BB, 51 R
See application file for complete search history.

(56) References Cited

U.S. PATENT DOCUMENTS

| | | | | | |
|---|---|---|---|---|---|
| 4,777,844 | A * | 10/1988 | DeBell | F16C 7/023 74/579 E | |
| 4,815,360 | A | 3/1989 | Winterle | | |
| 5,128,083 | A * | 7/1992 | Brookes | C04B 41/00 264/293 | |
| 5,384,200 | A * | 1/1995 | Giles | C23C 4/11 428/545 | |
| 6,491,143 | B1 * | 12/2002 | Stenquist | F16F 9/0218 188/269 | |
| 7,438,027 | B1 * | 10/2008 | Hinderks | F02B 75/32 123/197.1 | |
| 7,591,235 | B2 * | 9/2009 | Lemke | F02B 75/282 123/41.35 | |
| 2007/0095309 | A1 * | 5/2007 | Reisser | F01B 3/0079 123/53.6 | |
| 2007/0215093 | A1 * | 9/2007 | Lemke | F02B 75/32 123/51 AA | |
| 2008/0141921 | A1 * | 6/2008 | Hinderks | F02B 59/00 114/274 | |
| 2008/0163848 | A1 * | 7/2008 | Lemke | F02B 75/32 123/197.1 | |
| 2008/0314350 | A1 | 12/2008 | Reisser | | |
| 2012/0227389 | A1 * | 9/2012 | Hinderks | F02B 75/002 60/317 | |
| 2013/0167798 | A1 * | 7/2013 | Lawler | F16J 1/09 123/193.4 | |
| 2015/0192096 | A1 | 7/2015 | Wundling et al. | | |
| 2016/0169185 | A1 * | 6/2016 | Iwasaki | F02F 3/26 | |
| 2016/0169387 | A1 * | 6/2016 | Meirelles Tomanik | F16J 9/12 427/256 | |
| 2016/0252065 | A1 * | 9/2016 | Johnson | F02B 23/0663 123/51 R | |
| 2018/0128203 | A1 * | 5/2018 | Koeberlein | C23C 28/3455 | |
| 2018/0179644 | A1 * | 6/2018 | Koeberlein | C23C 4/11 | |
| 2018/0313294 | A1 * | 11/2018 | Wagenblast | F02F 3/0084 | |
| 2019/0022805 | A1 * | 1/2019 | Gill | F02F 3/0023 | |
| 2021/0071617 | A1 * | 3/2021 | Dickerson | F16C 7/02 | |
| 2022/0048146 | A1 * | 2/2022 | Gill | F02F 3/003 | |

FOREIGN PATENT DOCUMENTS

| | | | |
|---|---|---|---|
| DE | 3711205 | A1 | 10/1988 |
| DE | 102005006340 | A1 | 4/2007 |
| DE | 102016110181 | A1 | 12/2017 |
| EP | 0773359 | A1 | 5/1997 |
| JP | H02161156 | A | 6/1990 |
| JP | 2004028020 | A | 1/2004 |
| JP | 2009530531 | A | 8/2009 |
| JP | 2015503700 | A | 2/2015 |
| KR | 20100136827 | A | 12/2010 |
| WO | WO-2003/016701 | A1 | 2/2003 |
| WO | 2005124124 | A1 | 12/2005 |
| WO | 2013101784 | A1 | 7/2013 |

OTHER PUBLICATIONS

International Search Report and Written Opinion of the International Searching Authority for International Application No. PCT/GB2021/052412 dated Mar. 14, 2022.
European Search Report for Great Britian Application No. GB2014614.8 dated Feb. 17, 2021.
Office Action dated Dec. 2, 2025 issued in corresponding Japanese Patent Application No. 2023-517802.
Office Action Issued Dec. 23, 2025 in European Application No. 21801159.1.

* cited by examiner

INTERNAL COMBUSTION ENGINE

CROSS-REFERENCE TO RELATED APPLICATIONS

This application is a national phase under 35 U.S.C. § 371 of PCT International Application No. PCT/GB2021/052412 which has an International filing date of Sep. 16, 2021, which claims priority to Great Britian Application No. 2014614.8, filed Sep. 16, 2020, the entire contents of each of which are hereby incorporated by reference.

FIELD

This relates to an internal combustion engine, and in particular to an internal combustion engine utilising technical ceramic components.

BACKGROUND

Internal combustion engines are utilised in wide range of applications and environments to provide motive power, for example as part of a static generator set or as part of the powertrain of a vehicle.

However, around one third of the energy used by internal combustion engines is wasted to the cooling systems required to maintain the metal components of the internal combustion engine within acceptable operating parameters. As a result, average operating efficiencies of internal combustion engines is low, typically around 30%.

Technical ceramic materials have been proposed as a means to overcome the deficiencies of metal components. However, there are a number of drawbacks with the use of ceramics. For example, technical ceramics are brittle compared to metals. As such, it is not possible to simply replace metal parts with ones manufactured from technical ceramics, due to such components being subject to high tensile cyclic loads. Moreover, technical ceramics crack readily when subjected to high temperature gradients.

SUMMARY

Aspects of the present disclosure relate to an internal combustion engine, and in particular to an internal combustion engine utilising technical ceramic components.

According to a first aspect, there is provided a piston arrangement for an internal combustion engine, the piston arrangement comprising:

a plurality of pistons, wherein the pistons are arranged in an opposed configuration, and wherein one or more of said pistons is at least partially constructed from a technical ceramic material.

Beneficially, embodiments of the present invention resolve or at least mitigate issues with conventional systems in that no components are subjected to tensile cyclic loads, and no significant temperature gradients are developed. Embodiments of the present invention can thus achieve a life of at least 30,000 hours with a brake thermal efficiency of at least 70%.

The technical ceramic material may comprise or take the form of a silicon-based technical ceramic, e.g. Silicon Nitride.

The one or more pistons may be wholly or substantially wholly constructed from the technical ceramic material.

Alternatively, the one or more pistons may be partially constructed from the technical ceramic material. The one or more pistons may be constructed from 10% or greater technical ceramic material. The one or more pistons may be constructed from 20% or greater technical ceramic material. The one or more pistons may be constructed from 30% or greater technical ceramic material. The one or more pistons may be constructed from 40% or greater technical ceramic material. The one or more pistons may be constructed from 50% or greater technical ceramic material. The one or more pistons may be constructed from 60% or greater technical ceramic material. The one or more pistons may be constructed from 70% or greater technical ceramic material. The one or more pistons may be constructed from 80% or greater technical ceramic material. The one or more pistons may be constructed from 90% or greater technical ceramic material.

In some embodiments, in particular but not exclusively those in which the one or more pistons are constructed from between 50% and 100% technical ceramic, the piston arrangement may obviate the need for a piston liner, e.g. a piston liner comprising a technical ceramic, and/or a piston coating, e.g. a piston coating comprising a technical ceramic.

In other embodiments, the piston arrangement may comprise a piston liner, e.g. a piston liner comprising a technical ceramic, and/or a piston coating, e.g. a piston coating comprising a technical ceramic. The piston liner and/or piston coating may comprise or take the form of a Titanium-based technical ceramic, e.g. Titanium Nitride.

The piston coating may be embedded in the outer surface of the piston.

At least one of the pistons may comprise one or more seal elements, e.g. piston rings. The one or more seal elements may be constructed from a technical ceramic material. The one or more seal elements may be constructed from a plurality of technical ceramic material components. The plurality of technical ceramic material components may comprise a first component and a second component. The second component may be embedded in the first component. The first component may comprise or take the form of a silicon-based technical ceramic material, e.g. Silicon Nitride. The second component may comprise or take the form of a Titanium-based technical ceramic material, e.g. Titanium Nitride.

At least one of the pistons may be at least partially constructed from a metallic material, such as a metal or a metal alloy. For example, at least part of one or more of said pistons may be constructed from cast iron, steel, e.g. stainless steel or an austenitic nickel-chromium-based superalloy such as Inconel®.

The pistons may each comprise a piston rod.

The piston rod of at least one of the pistons may comprise an axially disposed bore formed therein. In particular embodiments, each piston rod of the piston arrangement may be provided with a respective bore.

The piston arrangement may comprise a heat transfer member configured for location in the bore of the piston rod. The heat transfer member may be reconfigurable from a first, solid, state to a second state in which at least part of the heat transfer member is in a liquid state, the heat transfer member in said second state being movable relative to the bore of the piston rod so as to transfer heat away from and thus cool the piston rod as the piston reciprocates.

In use, the piston rod will heat up during operation of the internal combustion engine. When the temperature of at least part of the heat transfer member exceeds a preselected temperature threshold, e.g. the melting temperature of the heat transfer member, at least part of, and in particular embodiments all or a substantial part of, the heat transfer member is reconfigured from the first, solid, state to the second state. Reconfiguration of the heat transfer member permits the heat transfer member to move relative to the piston rod and thus transport heat away from the hot piston end as the piston reciprocates between its bottom dead centre (BDC) position and its top dead centre (TDC) position.

The heat transfer member may be formed from a metallic material. In particular embodiments, the heat transfer member may be formed from sodium.

As described above, the heat transfer member may be configured for location in the bore of the piston rod. For example, the dimensions and/or shape of the heat transfer member may be selected to facilitate location of the heat transfer member in the bore of the piston rod.

The heat transfer member may comprise or take the form of a cylindrical member or substantially cylindrical member. However, it will be recognised that the heat transfer member may be any suitable shape and/or size to complement the respective bore in which it is to be located. The heat transfer member may comprise or take the form of a slug of material.

As described above, the piston arrangement comprises a plurality of pistons. For example, the piston arrangement may comprise 2 pistons, 4 pistons, 6 pistons or 8 pistons.

The piston rod, or at least part of the piston rod, of at least one of the pistons may be constructed from a metallic material, such as a metal or metal alloy. The piston rod may be constructed from cast iron, steel, e.g. stainless steel or an austenitic nickel-chromium-based superalloy such as Inconel®.

The piston rod of at least one of the pistons may comprise a pushrod portion. The pushrod portion may be constructed from cast iron, steel, e.g. stainless steel or an austenitic nickel-chromium-based superalloy such as Inconel®.

The piston rod of at least one of the pistons may comprise a wedge portion. The wedge portion may be constructed from cast iron, steel, e.g. stainless steel or an austenitic nickel-chromium-based superalloy such as Inconel®.

A coupling arrangement may be provided between the pushrod and the wedge portion. The coupling arrangement may, for example, comprise or take the form of a mechanical coupling such as a threaded coupling.

The wedge portion of the piston rod may comprise a plurality of segments. Where the wedge portion comprises a plurality of segments, the segments may together form part of the coupling arrangement, e.g. a threaded coupling for engaging a corresponding threaded coupling portion on the pushrod portion.

The pistons may each comprise a piston crown. The piston crown may be coupled to, or form an end portion of the piston. The piston crown may be configured for location in a cylinder of the internal combustion engine. The piston crown may sealingly engage the cylinder. In use, the combustion reaction urges the piston crown relative to the cylinder. The piston crown may be configured for coupling to the piston rod. The piston crown may be coupled to the piston rod by an interference fit. The piston crown may comprise a wedge portion configured, e.g. shaped and/or sized, to complementarily engage the wedge portion of the piston rod.

The piston crown, or at least part of the piston crown, of at least one of the pistons may be constructed from a technical ceramic material. The technical ceramic may comprise or take the form of a silicon-based technical ceramic, e.g. Silicon Nitride.

In use, the configuration of the piston means that load forces exerted on the piston crown by the combustion reaction place the piston crown in compression. Where the piston crown is constructed from a ceramic material, ensuring the ceramic material is in compression eliminates a common failure mode of ceramic materials.

The piston arrangement may comprise an insulation arrangement. The insulation arrangement may be interposed between the piston rod and the piston crown of at least one of the pistons.

The insulation arrangement may take the form of a unitary construction. In particular embodiments, the insulation arrangement may take the form of a modular construction. The insulation arrangement may comprise a plurality of segments.

The insulation arrangement may be constructed from a ceramic material. The insulation arrangement may be constructed from a Zirconium oxide material, e.g. Zirconia®.

The insulation arrangement may be configured and/or arranged such that when disposed on the piston rod axial slots or spaces are defined between the segments of the insulation arrangement. The insulation arrangement may be configured and/or arranged such that when disposed on the wedge portion of the piston rod axial slots or spaces are defined between the segments of the insulation arrangement.

Beneficially, the provision of an insulation arrangement configured and/or arranged such that when disposed on the piston rod (in particular the wedge portion of the piston rod) axial slots or spaces are defined between the segments of the insulation arrangement allows for differential thermal expansion of components of the piston while providing thermal insulation between the piston crown and piston rod.

At least one of the pistons may comprise a lubricant arrangement. The lubricant arrangement may be provided on the piston crown. The lubricant arrangement may be provided on an outer circumferential surface of the piston crown. The lubricant arrangement may comprise or take the form of a solid lubricant. The solid lubricant may be embedded in a coating applied to the or each piston.

The piston arrangement may comprise a cooling arrangement. The cooling arrangement may be configured to cool the piston shaft(s). The cooling arrangement may comprise one or more cooling nozzles configured to direct a coolant, in particular a coolant jet, onto the piston shaft(s). The coolant may comprise oil or an oil-based coolant.

At least one of the pistons may take the form of a solid piston. Beneficially, the provision of a solid piston facilitates ease of manufacture.

Alternatively, at least one of the pistons may be hollow and/or may comprise one or more bores, pockets and/or cavities.

Beneficially, the provision of one or more pistons which are hollow or which comprise one or more bores and/or pockets results in a reduction in the mass of the piston. This, in turn, results in a reduction of the reciprocating mass within the internal combustion engine, which given that the engine may be running at a high rotational speed, for example but not exclusively 3000 rpm to 7000 rpm, reduces the inertial load and thus significantly improves the working life of the piston arrangement.

The one or more bores, pockets and/or cavities may be formed by a drilling process. The one or more bores, pockets and/or cavities may be formed by a milling process. The one or more pistons may be formed by casting, e.g. by a lost core casting process. The one or more pistons may be formed by an injection moulding process. The one or more pistons may be formed by an additive manufacturing process such as 3D printing.

Where the one or more pistons comprises a plurality of bores, pockets and/or cavities, one or more of the bores, pockets and/or cavities may be circular in cross-section. Alternatively or additionally, where the one or more pistons comprises a plurality of bores, pockets and/or cavities, one or more of the bores, pockets and/or cavities may be annular or part-annular in cross-section.

Where the one or more pistons comprises a plurality of bores, pockets and/or cavities, at least two of the bores, pockets and/or cavities may be of the same size and/or shape.

Alternatively, where the one or more pistons comprises a plurality of bores, pockets and/or cavities, at least one of the bores, pockets and/or cavities may have a different size and/or shape to at least one other of the bores, pockets and/or cavities.

The piston rod of at least one of the pistons may be tapered. For example, a distal end portion of the piston rod may define a greater outer dimension e.g. diameter, that a proximal end portion of the piston rod.

At least one of the pistons may comprise a fluid communication arrangement. The fluid communication arrangement may comprise or take the form of one or more axial bores formed or otherwise provided, e.g. by a drilling and/or milling process, in the piston crown. The fluid communication arrangement may comprise one or more radial bores formed or otherwise provided, e.g. by a drilling and/or milling process, in the piston crown. The radial bores may communicate with the one or more axial bores in the piston crown.

In use, the fluid communication arrangement may facilitate fluid communication to urge one or more seal elements, e.g. piston rings, mounted on the piston crown against the cylinder bore during running.

Beneficially, this acts to energise and/or provide additional energisation of the seal elements, e.g. piston rings, against the cylinder.

Alternatively, the piston rings may be self-energised.

According to a second aspect, there is provided a piston and cylinder assembly for an internal combustion engine, the piston and cylinder assembly comprising:

the piston arrangement of the first aspect; and a cylinder arrangement comprising cylinders for receiving the pistons of the piston arrangement.

The cylinder arrangement may be at least partially constructed from a technical ceramic material. The technical ceramic material may comprise or take the form of a silicon-based technical ceramic, e.g. Silicon Nitride.

One or more of the cylinders may be wholly or substantially wholly constructed from a technical ceramic material.

Alternatively, one of more of the cylinders may be partially constructed from the technical ceramic material. The one or more cylinders may be constructed from 10% or greater technical ceramic material. The one or more cylinders may be constructed from 20% or greater technical ceramic material. The one or more cylinders may be constructed from 30% or greater technical ceramic material. The one or more cylinders may be constructed from 40% or greater technical ceramic material. The one or more cylinders may be constructed from 50% or greater technical ceramic material. The one or more cylinders may be constructed from 60% or greater technical ceramic material. The one or more cylinders may be constructed from 70% or greater technical ceramic material. The one or more cylinders may be constructed from 80% or greater technical ceramic material. The one or more cylinders may be constructed from 90% or greater technical ceramic material.

In some embodiments, in particular but not exclusively those in which the one or more cylinders are constructed from between 50% and 100% technical ceramic material, the cylinder arrangement may obviate the need for a cylinder liner and/or a cylinder coating.

In other embodiments, the cylinder arrangement may comprise a cylinder liner and/or a cylinder coating. The cylinder coating may be embedded in the cylinder.

The cylinder liner and/or cylinder coating may comprise or take the form of a technical ceramic material. The technical ceramic material may comprise or take the form of a Titanium-based technical ceramic, e.g. Titanium Nitride.

At least one of the cylinders may comprise one or more grooves formed or otherwise provided in its outer surface.

In use, hot exhaust gas, for example but not exclusively at around 5 bar, flows through the grooves at high speed, maintaining the outer surface of the cylinder at a relatively high temperature.

Beneficially, by facilitating the flow of the exhaust gas and maintaining the temperature on the outside of the cylinder the one or more grooves decreases the thermal gradient between the inside and outside of the cylinder. Where the cylinder is constructed from a ceramic material, the decrease in thermal gradient between the inside and outside of the cylinder mitigates a failure mode of ceramic materials.

At least one of the one or more grooves may be machined into or otherwise formed in the outer surface of the cylinder.

The one or more grooves may comprise of take the form of micro-grooves. At least one of the one or more grooves may have a width in the range 1 micron to 100 mm.

Where the cylinder comprises a plurality of the grooves, at least two of the grooves may be of the same width. Where the cylinder comprises a plurality of the grooves, at least two of the grooves may be of different widths.

The cylinder may comprise one or more inlet ports.

The cylinder may comprise one or more exhaust ports.

The cylinder may comprise a lubricant arrangement. The lubricant arrangement may be provided on the cylinder. The lubricant arrangement may be provided on an inner circumferential surface of the cylinder. The lubricant arrangement may comprise or take the form of a solid lubricant. The solid lubricant may be embedded in a coating applied to the cylinder.

The cylinder may comprise an insulator sleeve. The insulator sleeve may be disposed around the cylinder. The insulator sleeve may be constructed from a ceramic insulation material. The insulator sleeve may be constructed from a non-structural ceramic foam insulation material.

The piston and cylinder assembly may comprise a gas scavenging arrangement. The gas scavenging arrangement may be operatively associated with the cylinder.

The gas scavenging arrangement may be configured so that plug flow inlet charge air displaces combustion products with minimal mixing.

The gas scavenging arrangement may comprise providing relatively large intake and/or exhaust total port flow areas.

Beneficially, the gas scavenging arrangement provides uniform circumferential heat flow into the cylinder to minimise circumferential thermal gradients.

According to a third aspect, there is provided an internal combustion engine comprising the piston arrangement of the first aspect and/or the piston and cylinder assembly of the second aspect.

The internal combustion engine may comprise an exhaust reservoir. The exhaust reservoir may be disposed around an outer surface portion of the cylinder. The internal combustion engine may comprise an exhaust reservoir housing, the exhaust reservoir housing defining the exhaust reservoir.

The exhaust reservoir may be configured to receive exhaust from the combustion reaction.

One or more grooves may be formed or otherwise provided in the inner surface of the exhaust reservoir housing. The one or more grooves may comprise or take the form of micro-grooves. The grooves may be machined into the one or more inner surface of the exhaust reservoir housing, e.g. an axial end face of the exhaust reservoir housing. At least one of the one or more grooves may have a width in the range 1 micron to 100 mm.

In use, hot exhaust gas, for example but not exclusively at a pressure of around 5 Bar flows through the grooves at high speed, maintaining the outer surface of the cylinder at a relatively high temperature.

Beneficially, this decreases the thermal gradient between the inside and outside of the cylinder. Where the cylinder is constructed from a ceramic material, the decrease in thermal gradient between the inside and outside of the cylinder mitigates a failure mode of ceramic materials.

The exhaust reservoir housing may be modular in construction. For example, the exhaust reservoir housing may be manufactured in two or more parts. Beneficially, this facilitates the grooves to be provided on the axial end face of the exhaust reservoir housing.

The exhaust reservoir housing may comprise a bore for receiving the fuel injector.

The exhaust reservoir housing may comprise a boss portion. The boss portion may surround the bore for receiving the fuel injector. The boss portion may extend radially inwards from a circumferential wall of the exhaust reservoir housing.

The internal combustion engine may comprise a fuel injection arrangement. The fuel injection arrangement may comprise a port disposed in and/or through a wall of the cylinder. The port may be interposed between the pistons.

The fuel injection arrangement may comprise a boss portion disposed within the exhaust reservoir housing. The boss portion may be formed as part of or configured for coupling to the exhaust reservoir housing. For example, the boss portion may be coupled to the exhaust reservoir housing by an interference fit. Alternatively or additionally, the pipe may be coupled to the exhaust reservoir housing by a mechanical coupling, such as a snap-fit connection, threaded connector or one or more mechanical fastener such as a bolt. The boss portion may extend from a wall of the exhaust reservoir housing. The boss portion may extend into the chamber defined by the exhaust reservoir housing. A distal end portion of the boss portion may be configured, e.g. shaped and/or dimensioned, to engage an outer surface of the cylinder. A bore of the boss portion may communicate with the port of the fuel injection arrangement. The bore may surround the port.

A fuel injection arrangement may comprise one or more fuel injectors. The fuel injector may be disposed within the boss portion. The fuel injector may communicate with the port.

The internal combustion engine may comprise a cooling arrangement for the fuel injection arrangement.

Beneficially, this ensures that the fuel injector remain within maximum service temperature even when located in a wall of a cylinder at high temperature, e.g. a temperature of around 1000 C.

The cooling arrangement may comprise or take the form of a heat pipe-type cooling arrangement.

The fuel injection arrangement may comprise a sleeve. The sleeve may be disposed within the boss portion, i.e. on an inner wall of the boss portion. The sleeve may comprise or take the form of an insulating sleeve.

The sleeve may be at least partially constructed from a technical ceramic material, in particular a technical ceramic with low thermal conductivity. The sleeve may be at least partially constructed from Zirconia. The sleeve may be at least partially constructed from a graphite and ceramic foam.

The fuel injection arrangement may comprise a cylindrical block. The cylindrical block may be disposed within the sleeve. The sleeve may define an outer sleeve and the cylindrical block may define an inner sleeve.

The cylindrical block may be at least partially constructed from a technical ceramic, in particular a technical ceramic with high thermal conductivity. The cylindrical block may be constructed from Aluminium Nitride.

The cooling arrangement may comprise one or more heat pipes. The cooling arrangement may comprise a plurality of heat pipes, e.g. two, three, four, five, six or more than six heat pipes. The heat pipes may be arranged parallel to each other. The heat pipes may be circumferentially arranged and/or circumferentially spaced.

The one or more heat pipes may be coupled to or operatively associated with a heat sink. The heat sink may be external to the exhaust volume. The heat sink may be disposed in a charge volume. The charge volume may be cooled. The one or more heat pipes may have a length greater than the fuel injector. For example, the one or more heat pipes may extend from at or near a tip of the fuel injector and past the fuel injector head.

The one or more heat pipes may comprise an envelope.

The one or more heat pipes may comprise a saturated working fluid. The working fluid may comprise or take the form of a liquid at ambient temperature. The working fluid may comprise sodium. The working fluid may comprise mercury.

The one or more heat pipes may comprise a wick.

In use, when the fuel injector end heats up and the temperature of the working fluid exceeds its boiling point, the working fluid will vaporise and travel up the heat pipe(s) towards the heat sink where it will condense and be returned to the hot end via the wick structure through capillary pressure. Beneficially, the cooling arrangement may conduct heat from the fuel injector, due to the latent heat of vaporisation.

The one or more heat pipes may be constructed from a metallic material, such as a metal or metal alloy. For example, the one or more heat pipes may be constructed from steel, in particular stainless steel.

The internal combustion engine may comprise a sleeve bearing.

Beneficially, the sleeve bearing supports side loads from the crank.

The internal combustion engine may comprise a frame. The frame may be constructed from a metallic material, such as a metal or metal alloy.

Beneficially, the frame may react against axial combustion and/or inertial loads and/or side loads from operation of the crank.

According to a fourth aspect, there is provided a generator set comprising the internal combustion engine of the third aspect.

The generator set may comprise a generator. The generator may be coupled to the internal combustion engine. The generator may be configured to convert the mechanical energy output from the internal combustion engine into electrical energy.

The generator set may comprise a power source. The power source may comprise a battery. The power source may comprise or take the form of a rechargeable power source, in particular but not exclusively a rechargeable battery. The generator may supply the electrical energy to charge the power source.

The generator set may comprise or may be coupled to a motor. The motor may comprise or take the form of a rotary drive, a linear motor or other drive for converting electrical power into motive power. The motor may comprise or take the form of an electric motor. The motor may be coupled to the battery. The battery may supply the electrical energy to the motor to drive the motor. Alternatively, the motor may be directly driven by the generator. Alternatively or additionally, the battery may supply the electrical energy to another component or system, for example but not exclusively the electrical system of a vehicle.

According to a fifth aspect, there is provided a cylinder arrangement for an internal combustion engine, the cylinder arrangement comprising:

a cylinder for receiving a piston of the internal combustion engine, wherein the cylinder is at least partially constructed from a technical ceramic material, and wherein one or more grooves are formed or otherwise provided in the outer surface of the cylinder.

In use, hot exhaust gas, for example but not exclusively at around 5 bar, flows through the grooves at high speed, maintaining the outer surface of the cylinder at a relatively high temperature.

Beneficially, by facilitating the flow of the exhaust gas and maintaining the temperature on the outside of the cylinder the one or more grooves decreases the thermal gradient between the inside and outside of the cylinder. Where the cylinder is constructed from a ceramic material, the decrease in thermal gradient between the inside and outside of the cylinder mitigates a failure mode of ceramic materials.

The technical ceramic material may comprise or take the form of a silicon-based technical ceramic. For example, the technical ceramic material may comprise or take the form of Silicon Nitride.

The cylinder may be wholly or substantially wholly constructed from the technical ceramic material.

Alternatively, the cylinder may be partially constructed from the technical ceramic material. The cylinder may be constructed from 10% or greater technical ceramic material. The cylinder may be constructed from 20% or greater technical ceramic material. The cylinder may be constructed from 30% or greater technical ceramic material. The cylinder may be constructed from 40% or greater technical ceramic material. The cylinder may be constructed from 50% or greater technical ceramic material. The cylinder may be constructed from 60% or greater technical ceramic material. The cylinder may be constructed from 70% or greater technical ceramic material. The cylinder may be constructed from 80% or greater technical ceramic material. The cylinder may be constructed from 90% or greater technical ceramic material.

In some embodiments, in particular but not exclusively those in which the cylinder is constructed from between 50% and 100% technical ceramic, the cylinder arrangement may obviate the need for a cylinder liner and/or a cylinder coating.

In other embodiments, the cylinder arrangement may comprise a cylinder liner and/or a cylinder coating. The cylinder coating may be embedded in the cylinder.

The cylinder liner and/or cylinder coating may comprise or take the form of a technical ceramic material. For example, the cylinder liner and/or cylinder coating may comprise or take the form of a Titanium-based technical ceramic, e.g. Titanium Nitride.

At least one of the one or more grooves may be machined into or otherwise formed in the outer surface of the cylinder.

The one or more grooves may comprise of take the form of micro-grooves. At least one of the one or more grooves may have a width in the range 1 micron to 100 mm.

Where the cylinder comprises a plurality of the grooves, at least two of the grooves may be of the same width. Where the cylinder comprises a plurality of the grooves, at least two of the grooves may be of different widths.

The cylinder may comprise one or more inlet ports.

The cylinder may comprise one or more exhaust ports.

The cylinder may comprise a lubricant arrangement. The lubricant arrangement may be provided on the cylinder. The lubricant arrangement may be provided on an inner circumferential surface of the cylinder. The lubricant arrangement may comprise or take the form of a solid lubricant. The solid lubricant may be embedded in a coating applied to the cylinder.

The cylinder may comprise an insulator sleeve. The insulator sleeve may be disposed around the cylinder. The insulator sleeve may be constructed from a ceramic insulation material. The insulator sleeve may be constructed from a non-structural ceramic foam insulation material.

The cylinder arrangement may comprise a plurality of the cylinders.

According to a sixth aspect, there is provided a piston and cylinder assembly for an internal combustion engine, the piston and cylinder assembly comprising:

the cylinder arrangement of the fifth aspect; and a piston arrangement comprising one or more pistons.

At least one of the pistons may be at least partially constructed from a technical ceramic material. For example, the technical ceramic material may comprise or take the form of a silicon-based technical ceramic material, e.g. Silicon Nitride.

At least one of the pistons may be wholly or substantially wholly constructed from the technical ceramic material.

Alternatively, at least one of the pistons may be partially constructed from the technical ceramic material. The technical ceramic material may comprise or take the form of a silicon-based technical ceramic, e.g. Silicon Nitride.

The one or more pistons may be wholly or substantially wholly constructed from the technical ceramic material.

Alternatively, the one or more pistons may be partially constructed from the technical ceramic material. The one or more pistons may be constructed from 10% or greater technical ceramic material. The one or more pistons may be constructed from 20% or greater technical ceramic material. The one or more pistons may be constructed from 30% or greater technical ceramic material. The one or more pistons may be constructed from 40% or greater technical ceramic material. The one or more pistons may be constructed from 50% or greater technical ceramic material. The one or more pistons may be constructed from 60% or greater technical ceramic material. The one or more pistons may be constructed from 70% or greater technical ceramic material. The one or more pistons may be constructed from 80% or greater technical ceramic material. The one or more pistons may be constructed from 90% or greater technical ceramic material.

In some embodiments, in particular but not exclusively those in which the one or more pistons are constructed from between 50% and 100% technical ceramic, the piston arrangement may obviate the need for a piston liner, e.g. a piston liner comprising a technical ceramic, and/or a piston coating, e.g. a piston coating comprising a technical ceramic.

In other embodiments, the piston arrangement may comprise a piston liner, e.g. a piston liner comprising a technical ceramic, and/or a piston coating, e.g. a piston coating comprising a technical ceramic. The piston liner and/or piston coating may comprise or take the form of a Titanium-based technical ceramic, e.g. Titanium Nitride.

The piston coating may be embedded in the outer surface of the piston.

At least one of the pistons may comprise one or more seal elements, e.g. piston rings. The one or more seal elements may be constructed from a technical ceramic material. The one or more seal elements may be constructed from a plurality of technical ceramic material components. The plurality of technical ceramic material components may comprise a first component and a second component. The second component may be embedded in the first component. The first component may comprise or take the form of a silicon-based technical ceramic material, e.g. Silicon Nitride. The second component may comprise or take the form of a Titanium-based technical ceramic material, e.g. Titanium Nitride.

At least part of one or more of said pistons may be constructed from a metallic material, such as a metal or a metal alloy. For example, at least part of one or more of said pistons may be constructed from cast iron, steel, e.g. stainless steel or an austenitic nickel-chromium-based superalloy such as Inconel®.

Beneficially, embodiments of the present invention resolve or at least mitigate issues with conventional systems in that no components are subjected to tensile cyclic loads, and no significant temperature gradients are developed. Embodiments of the present invention can thus achieve a life of at least 30,000 hours with a brake thermal efficiency of at least 70%.

The one or more pistons may each comprise a piston rod.

The piston rod of at least one of the pistons may comprise an axially disposed bore formed therein. In particular embodiments, each piston rod of the piston arrangement may be provided with a respective bore.

The piston arrangement may comprise a heat transfer member configured for location in the bore of the piston rod. The heat transfer member may be reconfigurable from a first, solid, state to a second state in which at least part of the heat transfer member is in a liquid state, the heat transfer member in said second state being movable relative to the bore of the piston rod so as to transfer heat away from and thus cool the piston rod as the piston reciprocates.

In use, the piston rod will heat up during operation of the internal combustion engine. When the temperature of at least part of the heat transfer member exceeds a preselected temperature threshold, e.g. the melting temperature of the heat transfer member, at least part of, and in particular embodiments all or a substantial part of, the heat transfer member is reconfigured from the first, solid, state to the second state. Reconfiguration of the heat transfer member permits the heat transfer member to move relative to the piston rod and thus transport heat away from the hot piston end as the piston reciprocates between its bottom dead centre (BDC) position and its top dead centre (TDC) position.

The heat transfer member may be formed from a metallic material. In particular embodiments, the heat transfer member may be formed from sodium.

As described above, the heat transfer member may be configured for location in the bore of the piston rod. For example, the dimensions and/or shape of the heat transfer member may be selected to facilitate location of the heat transfer member in the bore of the piston rod.

The heat transfer member may comprise or take the form of a cylindrical member or substantially cylindrical member. However, it will be recognised that the heat transfer member may be any suitable shape and/or size to complement the respective bore in which it is to be located. The heat transfer member may comprise or take the form of a slug of material.

As described above, the piston arrangement may comprise one or more pistons, i.e. a single piston or a plurality of pistons, for example 2 pistons, 4 pistons, 6 pistons or 8 pistons.

Where the piston arrangement comprises a plurality of pistons, the pistons may be arranged in any suitable configuration. For example, the pistons may be arranged in an opposed configuration.

The piston rod, or at least part of the piston rod, may be constructed from a metallic material, such as a metal or metal alloy. The piston rod may be constructed from cast iron, steel, e.g. stainless steel or an austenitic nickel-chromium-based superalloy such as Inconel®.

The piston rod may comprise a pushrod portion. The pushrod portion may be constructed from cast iron, steel, e.g. stainless steel or an austenitic nickel-chromium-based superalloy such as Inconel®.

The piston rod may comprise a wedge portion. The wedge portion may be constructed from cast iron, steel, e.g. stainless steel or an austenitic nickel-chromium-based superalloy such as Inconel®.

A coupling arrangement may be provided between the pushrod and the wedge portion. The coupling arrangement may, for example, comprise or take the form of a mechanical coupling such as a threaded coupling.

The wedge portion of the piston rod may comprise a plurality of segments. Where the wedge portion comprises a plurality of segments, the segments may together form part of the coupling arrangement, e.g. a threaded coupling for engaging a corresponding threaded coupling portion on the pushrod portion.

The or each piston may comprise a piston crown. The piston crown may be coupled to, or form an end portion of the piston. The piston crown may be configured for location in a cylinder of the internal combustion engine. The piston crown may sealingly engage the cylinder. In use, the combustion reaction urges the piston crown relative to the cylinder.

The piston crown may be configured for coupling to the piston rod. The piston crown may be coupled to the piston rod by an interference fit. The piston crown may comprise a wedge portion configured, e.g. shaped and/or sized, to complementarily engage the wedge portion of the piston rod.

At least part of the piston crown may be constructed from a ceramic material, in particular a technical ceramic material. For example, at least part of the piston crown may be constructed from Silicon Nitride $Si_3N_4$.

In use, the configuration of the piston means that load forces exerted on the piston crown by the combustion reaction place the piston crown in compression. Where the piston crown is constructed from a ceramic material, ensuring the ceramic material is in compression eliminates a common failure mode of ceramic materials.

The piston arrangement may comprise an insulation arrangement. The insulation arrangement may be interposed between the piston rod and the piston crown of at least one of the pistons.

The insulation arrangement may take the form of a unitary construction. In particular embodiments, the insulation arrangement may take the form of a modular construction. The insulation arrangement may comprise a plurality of segments.

The insulation arrangement may be constructed from a ceramic material. The insulation arrangement may be constructed from a Zirconium oxide material such as Zirconia®.

The insulation arrangement may be configured and/or arranged such that when disposed on the piston rod axial slots or spaces are defined between the segments of the insulation arrangement. The insulation arrangement may be configured and/or arranged such that when disposed on the wedge portion of the piston rod axial slots or spaces are defined between the segments of the insulation arrangement.

Beneficially, the provision of an insulation arrangement configured and/or arranged such that when disposed on the piston rod (in particular the wedge portion of the piston rod) axial slots or spaces are defined between the segments of the insulation arrangement allows for differential thermal expansion of components of the piston while providing thermal insulation between the piston crown and piston rod.

The or each piston may comprise a lubricant arrangement. The lubricant arrangement may be provided on the piston crown. The lubricant arrangement may be provided on an outer circumferential surface of the piston crown. The lubricant arrangement may comprise or take the form of a solid lubricant. The solid lubricant may be embedded in a coating applied to the or each piston.

The piston and cylinder assembly may comprise a gas scavenging arrangement. The gas scavenging arrangement may be operatively associated with the cylinder.

The gas scavenging arrangement may be configured so that plug flow inlet charge air displaces combustion products with minimal mixing.

The gas scavenging arrangement may comprise providing relatively large intake and/or exhaust total port flow areas.

Beneficially, the gas scavenging arrangement provides uniform circumferential heat flow into the cylinder to minimise circumferential thermal gradients.

Features of the piston and cylinder assemblies described above or below with respect to any other aspect, example or embodiment of the present disclosure may also apply alone or in combination in the piston and cylinder assembly of this aspect.

According to a seventh aspect, there is provided an internal combustion engine comprising the cylinder arrangement of the fifth aspect and/or the piston and cylinder assembly of the sixth aspect.

Features of the internal combustion engines described above or below with respect to any other aspect, example or embodiment of the present disclosure may also apply alone or in combination in the internal combustion engine of this aspect.

According to an eighth aspect, there is provided a generator set comprising the internal combustion engine of the seventh aspect.

Features of the generator sets described above or below with respect to any other aspect, example or embodiment of the present disclosure may also apply alone or in combination in the generator set of this aspect.

According to a ninth aspect, there is provided a piston arrangement for an internal combustion engine, the piston arrangement comprising:

one or more pistons, wherein a piston rod of at least one of the pistons comprises an axially disposed bore formed therein; and a heat transfer member configured for location in the bore of the piston rod, wherein the heat transfer member is reconfigurable from a first, solid, state to a second state in which at least part of the heat transfer member is in a liquid state, the heat transfer member in said second state being movable relative to the bore of the piston rod so as to transfer heat away from and thus cool the piston rod as the piston reciprocates.

At least part of one or more of said pistons may be constructed from a technical ceramic material. The technical ceramic material may comprise or take the form of a silicon-based technical ceramic material, e.g. Silicon Nitride.

At least part of one or more of said pistons may be constructed from a metallic material, such as a metal or a metal alloy. For example, At least part of one or more of said pistons may be constructed from cast iron, steel, e.g. stainless steel or an austenitic nickel-chromium-based superalloy such as Inconel®.

In use, the piston rod will heat up during operation of the internal combustion engine. When the temperature of at least part of the heat transfer member exceeds a preselected temperature threshold, e.g. the melting temperature of the heat transfer member, at least part of, and in particular embodiments all or a substantial part of, the heat transfer member is reconfigured from the first, solid, state to the second state. Reconfiguration of the heat transfer member permits the heat transfer member to move relative to the piston rod and thus transport heat away from the hot piston end as the piston reciprocates between its bottom dead centre (BDC) position and its top dead centre (TDC) position.

Beneficially, embodiments of the present invention resolve or at least mitigate issues with conventional systems in that no components are subjected to tensile cyclic loads, and no significant temperature gradients are developed. Embodiments of the present invention can thus achieve a life of at least 30,000 hours with a brake thermal efficiency of at least 70%.

Features of the piston arrangements described above or below with respect to any other aspect, example or embodiment of the present disclosure may also apply alone or in combination in the piston arrangement of this aspect.

According to a tenth aspect, there is provided a piston and cylinder assembly for an internal combustion engine, the piston and cylinder assembly comprising:

the piston arrangement of the ninth aspect; and a cylinder arrangement comprising one or more cylinders for receiving the respective one or more pistons of the piston arrangement.

Features of the piston and cylinder assemblies described above or below with respect to any other aspect, example or embodiment of the present disclosure may also apply alone or in combination in the piston and cylinder assembly of this aspect.

According to an eleventh aspect, there is provided an internal combustion engine comprising the piston arrangement of the ninth aspect and/or the piston and cylinder assembly of the tenth aspect.

Features of the internal combustion engines described above or below with respect to any other aspect, example or embodiment of the present disclosure may also apply alone or in combination in the internal combustion engine of this aspect.

According to a twelfth aspect, there is provided a generator set comprising the internal combustion engine of the eleventh aspect.

Features of the generator sets described above or below with respect to any other aspect, example or embodiment of the present disclosure may also apply alone or in combination in the generator set of this aspect.

According to a thirteenth aspect, there is provided a piston for an internal combustion engine, the piston comprising:

a piston rod;

a piston crown, wherein at least part of the piston crown is constructed from a technical ceramic material; and an insulation arrangement interposed between the piston rod and the piston crown, wherein the insulation arrangement comprises a plurality of segments configured and/or arranged such that when disposed on the piston rod axial slots or spaces are defined between the segments of the insulation arrangement.

Beneficially, the provision of an insulation arrangement configured and/or arranged such that when disposed on the piston rod (in particular the wedge portion of the piston rod) axial slots or spaces are defined between the segments of the insulation arrangement allows for differential thermal expansion of components of the piston while providing thermal insulation between the piston crown and piston rod.

Features of the pistons described above or below with respect to any other aspect, example or embodiment of the present disclosure may also apply alone or in combination in the piston of this aspect.

According to a fourteenth aspect, there is provided a piston and cylinder assembly for an internal combustion engine, the piston and cylinder assembly comprising:

the piston of the first thirteenth aspect; and a cylinder arrangement comprising a cylinder for receiving the piston.

Features of the piston and cylinder assemblies described above or below with respect to any other aspect, example or embodiment of the present disclosure may also apply alone or in combination in the piston and cylinder assembly of this aspect.

According to an fifteenth aspect, there is provided an internal combustion engine comprising the piston of the thirteenth aspect and/or the piston and cylinder assembly of the fourteenth aspect.

Features of the internal combustion engines described above or below with respect to any other aspect, example or embodiment of the present disclosure may also apply alone or in combination in the piston and cylinder assembly of this aspect.

According to a sixteenth aspect, there is provided a generator set comprising the internal combustion engine of the fifteenth aspect.

Features of the generator sets described above or below with respect to any other aspect, example or embodiment of the present disclosure may also apply alone or in combination in the generator set of this aspect.

According to a seventeenth aspect, there is provided a cooling arrangement for a fuel injection arrangement of an internal combustion engine, wherein the cooling arrangement comprises one or more heat pipes.

Beneficially, the cooling arrangement ensures that the fuel injector(s) remain within maximum service temperature even when located in a wall of a cylinder at high temperature, e.g. a temperature of around 1000 C.

The fuel injection arrangement may comprise a sleeve. The sleeve may be disposed within the boss portion, i.e. on an inner wall of the boss portion. The sleeve may comprise or take the form of an insulating sleeve.

The sleeve may be at least partially constructed from a technical ceramic material, in particular a technical ceramic with low thermal conductivity. The sleeve may be at least partially constructed from Zirconia. The sleeve may be at least partially constructed from a graphite and ceramic foam.

The fuel injection arrangement may comprise a cylindrical block. The cylindrical block may be disposed within the sleeve. The sleeve may define an outer sleeve and the cylindrical block may define an inner sleeve.

The cylindrical block may be at least partially constructed from a technical ceramic, in particular a technical ceramic with high thermal conductivity. The cylindrical block may be constructed from Aluminium Nitride.

As described above, the cooling arrangement comprises one or more heat pipes.

The cooling arrangement may comprise a plurality of heat pipes, e.g. two heat pipes. The heat pipes may be arranged parallel to each other. The heat pipes may be circumferentially arranged and/or circumferentially spaced.

The one or more heat pipes may be coupled to or operatively associated with a heat sink. The heat sink may be disposed in a charge volume. The charge volume may be cooled. The one or more heat pipes may have a length greater than the fuel injector. For example, the one or more heat pipes may extend from at or near a tip of the fuel injector and past the fuel injector head.

The one or more heat pipes may comprise an envelope.

The one or more heat pipes may comprise a saturated working fluid. The working fluid may comprise or take the form of a liquid at ambient temperature. The working fluid may comprise sodium. The working fluid may comprise mercury.

The one or more heat pipes may comprise a wick.

In use, when the fuel injector end heats up and the temperature of the working fluid exceeds its boiling point, the working fluid will vaporise and travel up the heat pipe(s) towards the heat sink where it will condense and be returned to the hot end via the wick structure through capillary pressure. Beneficially, the cooling arrangement may conduct heat from the fuel injector, due to the latent heat of vaporisation.

The one or more heat pipes may be constructed from a metallic material, such as a metal or metal alloy. For example, the one or more heat pipes may be constructed from steel, in particular stainless steel.

According to an eighteenth aspect, there is provided an internal combustion engine comprising the cooling arrangement of the seventeenth aspect.

Features of the internal combustion engines described above or below with respect to any other aspect, example or embodiment of the present disclosure may also apply alone or in combination in the internal combustion engine of this aspect.

According to a nineteenth aspect, there is provided a generator set comprising the internal combustion engine of the eighteenth aspect.

Features of the generator sets described above or below with respect to any other aspect, example or embodiment of the present disclosure may also apply alone or in combination in the generator set of this aspect.

According to a twentieth aspect, there is provided a piston sealing element for an internal combustion engine, the piston sealing element comprising:

a first component, wherein the first component comprises or takes the form of a first technical ceramic material; and a second component embedded or otherwise provided on an outer surface of the first component, wherein the second component comprises or takes the form of a second, different, technical ceramic material.

The first technical ceramic material may comprise or take the form of a silicon-based ceramic material e.g. Silicon Nitride.

The second technical ceramic material may comprise or take the form of a Titanium-based ceramic e.g. Titanium Nitride.

The piston sealing element may comprise or take the form of a piston ring.

According to a twenty-first aspect, there is provided a piston arrangement comprising one or more of the piston sealing elements of the twentieth aspect.

Features of the piston arrangements described above or below with respect to any other aspect, example or embodiment of the present disclosure may also apply alone or in combination in the piston arrangement of this aspect.

According to a twenty-second aspect, there is provided a piston and cylinder assembly comprising the piston arrangement of the twenty-first aspect.

Features of the piston and cylinder assemblies described above or below with respect to any other aspect, example or embodiment of the present disclosure may also apply alone or in combination in the piston and cylinder assembly of this aspect.

According to a twenty-third aspect, there is provided an internal combustion engine comprising the piston arrangement of the twenty-first aspect and/or the piston and cylinder assembly of the twenty-second aspect.

Features of the internal combustion engine described above or below with respect to any other aspect, example or embodiment of the present disclosure may also apply alone or in combination in the internal combustion engine of this aspect.

According to a twenty-fourth aspect, there is provided a generator set comprising the internal combustion engine of the twenty-third aspect.

Features of the generator sets described above or below with respect to any other aspect, example or embodiment of the present disclosure may also apply alone or in combination in the generator set of this aspect.

The apparatus or any aspect defined herein, or any individual component or groups of components, may be manufactured in any suitable manner. In some examples the disclosed apparatus, or any individual component or groups of components may be manufactured by additive manufacturing. Such described additive manufacturing typically involves processes in which components are fabricated based on three-dimensional (3D) information, for example a three-dimensional computer model (or design file), of the component. Accordingly, examples described herein not only include the apparatus and associated components, but also methods of manufacturing the apparatus or associated components via additive manufacturing and computer software, firmware or hardware for controlling the manufacture of the apparatus and associated components via additive manufacturing. All future reference to "product" are understood to include the described apparatus and all associated components. The structure of the product may be represented digitally in the form of a design file. A design file, or computer aided design (CAD) file, is a configuration file that encodes one or more of the surface or volumetric configuration of the shape of the product. That is, a design file represents the geometrical arrangement or shape of the product. Design files may take any now known or later developed file format. For example, design files may be in the Stereolithography or "Standard Tessellation Language" (.stl) format which was created for stereolithography CAD programs of 3D Systems, or the Additive Manufacturing File (.amf) format, which is an American Society of Mechanical Engineers (ASME) standard that is an extensible markup-language (XML) based format designed to allow any CAD software to describe the shape and composition of any three-dimensional object to be fabricated on any additive manufacturing printer. Further examples of design file formats include AutoCAD (.dwg) files, Blender (.blend) files, Parasolid (.x_t) files, 3D Manufacturing Format (.3mf) files, Autodesk (3ds) files, Collada (.dae) files and Wavefront (.obj) files, although many other file formats exist. Design files may be produced using modelling (e.g. CAD modelling) software and/or through scanning the surface of a product to measure the surface configuration of the product. Once obtained, a design file may be converted into a set of computer executable instructions that, once executed by a processer, cause the processor to control an additive manufacturing apparatus to produce a product according to the geometrical arrangement specified in the design file. The conversion may convert the design file into slices or layers that are to be formed sequentially by the additive manufacturing apparatus. The instructions (otherwise known as geometric code or "G-code") may be calibrated to the specific additive manufacturing apparatus and may specify the precise location and amount of material that is to be formed at each stage in the manufacturing process. The formation may be through deposition, through sintering, or through any other form of additive manufacturing method. The code or instructions may be translated between different formats, converted into a set of data signals and transmitted, received as a set of data signals and converted to code, stored, etc., as necessary. The instructions may be an input to the additive manufacturing system and may come from a part designer, an intellectual property (IP) provider, a design company, the operator or owner of the additive manufacturing system, or from other sources. An additive manufacturing system may execute the instructions to fabricate the product using any of the technologies or methods disclosed herein. Design files or computer executable instructions may be stored in a (transitory or non-transitory) computer readable storage medium (e.g., memory, storage system, etc.) storing code, or computer readable instructions, representative of the product to be produced. As noted, the code or computer readable instructions defining the product that may be used to physically generate the object, upon execution of the code or instructions by an additive manufacturing system. For example, the instructions may include a precisely defined 3D model of the product and may be generated from any of a large variety of well-known computer aided design (CAD) software systems such as AutoCAD®, TurboCAD®, DesignCAD 3D Max, etc. Alternatively, a model or prototype of the component may be scanned to determine the three-dimensional information of the component. Accordingly, by controlling an additive manufacturing apparatus according to the computer executable instructions, the additive manufacturing apparatus may be instructed to print out the product. In light of the above, embodiments include methods of manufacture via additive manufacturing. This includes the steps of obtaining a design file representing the product and instructing an additive manufacturing apparatus to manufacture the product in assembled or unassembled form according to the design file. The additive manufacturing apparatus may include a processor that is configured to automatically convert the design file into computer executable instructions for controlling the manufacture of the product. In these embodiments, the design file itself may automatically cause the production of the product once input into the additive manufacturing device. Accordingly, in this embodiment, the design file itself may be considered computer executable instructions that cause the additive manufacturing apparatus to manufacture the product. Alternatively, the design file may be converted into instructions by an external computing system, with the resulting computer executable instructions being provided to the additive manufacturing device. Given the above, the design and manufacture of implementations of the subject matter and the operations described in this specification may be realised using digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this disclosure may be realised using one or more computer programs, i.e., one or more modules of computer program instructions, encoded on computer storage medium for execution by, or to control the operation of, data processing apparatus. Alternatively or in addition, the program instructions may be encoded on an artificially generated propagated signal, e.g., a machine-generated electrical, optical, or electromagnetic signal that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium may also be, or be included in, one or more separate physical components or media (e.g., multiple CDs, disks, or other storage devices). Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or other manufacturing technology.

The invention is defined by the appended claims. However, for the purposes of the present disclosure it will be understood that any of the features defined above or described below may be utilised in isolation or in combination. For example, features described above in relation to one of the above aspects or below in relation to the detailed description below may be utilised in any other aspect, or together form a new aspect.

BRIEF DESCRIPTION OF THE DRAWINGS

These and other aspects will now be described, by way of example only, with reference to the accompanying drawings, in which.

DETAILED DESCRIPTION OF THE DRAWINGS

Figure 1:
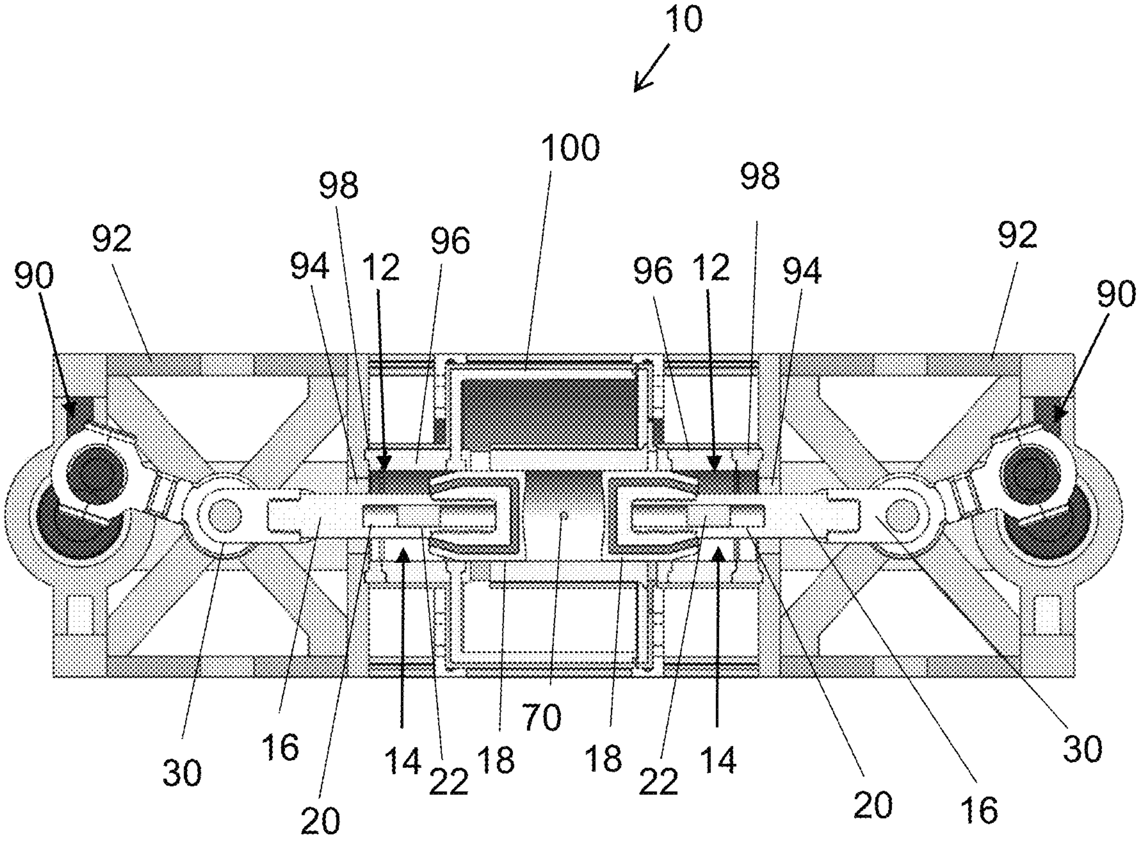
FIG. 1 shows a diagrammatic view of an internal combustion engine according to the present disclosure.

Referring first to FIG. 1 of the accompanying drawings, there is shown an internal combustion engine 10 according to the present disclosure.

As shown in FIG. 1, the internal combustion engine 10 comprises a piston arrangement, generally denoted 12, comprising a number of pistons 14 (two pistons are shown in FIG. 1). As will be described further below, each of the pistons 14 comprises a piston rod 16 and a piston crown 18.

Figure 2:
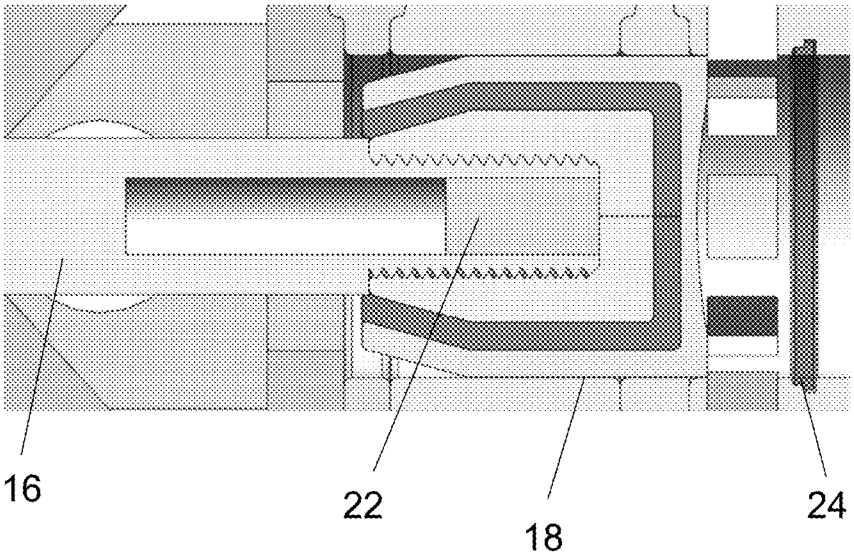
FIG. 2 shows an enlarged view of a piston arrangement of the internal combustion engine shown in Figure, with the piston at its bottom dead centre (BDC) position.
Figure 3:
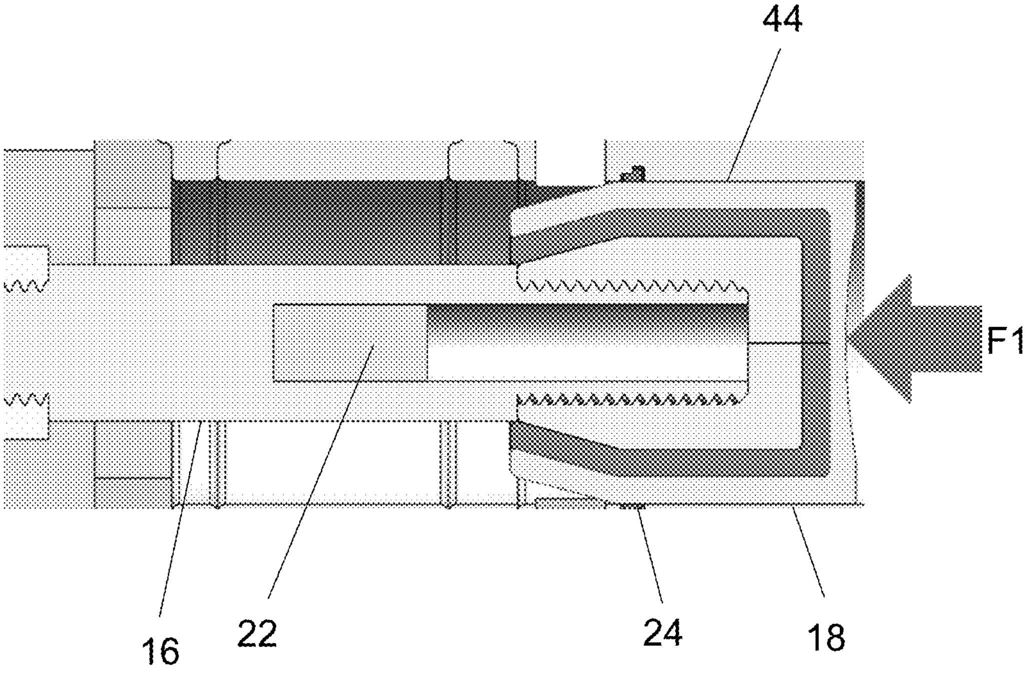
FIG. 3 shows an enlarged view of the piston arrangement of the internal combustion engine shown in FIG. 2, with the piston at its top dead centre (TDC) position.

As shown in FIG. 1, and referring now also to FIGS. 2 and 3 of the accompanying drawings, the piston rods 16 each comprise an axially disposed bore 20 formed therein. Heat transfer members 22 are configured for location in the bores 20 of the piston rods 16. The heat transfer members 22 are reconfigurable from a first, solid, state to a second state in which at least part of the heat transfer members 22 is in a liquid state, the heat transfer members 22 in said second state being movable relative to their respective bore 20 so as to transfer heat away from and thus cool the piston rod 16 as the pistons 14 reciprocate.

In use, the piston rods 16 will heat up during operation of the internal combustion engine 10. When the temperature of at least part of the heat transfer members 22 exceeds a preselected temperature threshold, e.g. the melting temperature of the heat transfer members 22, at least part of, and in particular embodiments all or a substantial part of, the heat transfer member 22 are reconfigured from the first, solid, state to the second, liquid, state. Reconfiguration of the heat transfer members 22 permits the heat transfer members 22 to move within the respective bores 20 and thus transport heat away from the hot piston end as the pistons 14 reciprocate between their bottom dead centre (BDC) position (as shown in FIG. 2) and their top dead centre (TDC) position (as shown in FIG. 3).

Beneficially, embodiments of the present invention resolve or at least mitigate issues with conventional systems in that no components are subjected to tensile cyclic loads, and no significant temperature gradients are developed. Embodiments of the present invention can thus achieve a life of at least 30,000 hours with a brake thermal efficiency of at least 70%.

In the illustrated piston arrangement 12, the heat transfer members 22 are formed from sodium. The heat transfer members 22 take the form of cylindrical members or substantially cylindrical members, the dimensions and/or shape of the heat transfer members 22 selected to facilitate location of the heat transfer members 22 in the bores 20 of the piston rods 16. However, it will be recognised that the heat transfer members 22 may be any suitable shape and/or size to complement the bores 20. The heat transfer members 22 may comprise or take the form of a slug of material.

In the illustrated piston arrangement 12, the piston rods 16 are constructed from cast iron. However, it will be understood that the piston rods 16 may alternatively be constructed from any other suitable material such as steel, e.g. stainless steel or an austenitic nickel-chromium-based superalloy such as Inconel®.

As shown in FIGS. 2 and 3, the internal combustion engine 10 further comprises a piston ring 24. In the illustrated internal combustion engine 10, the piston ring 24 is constructed from a technical ceramic material, namely Silicon Nitride.

Figure 4:
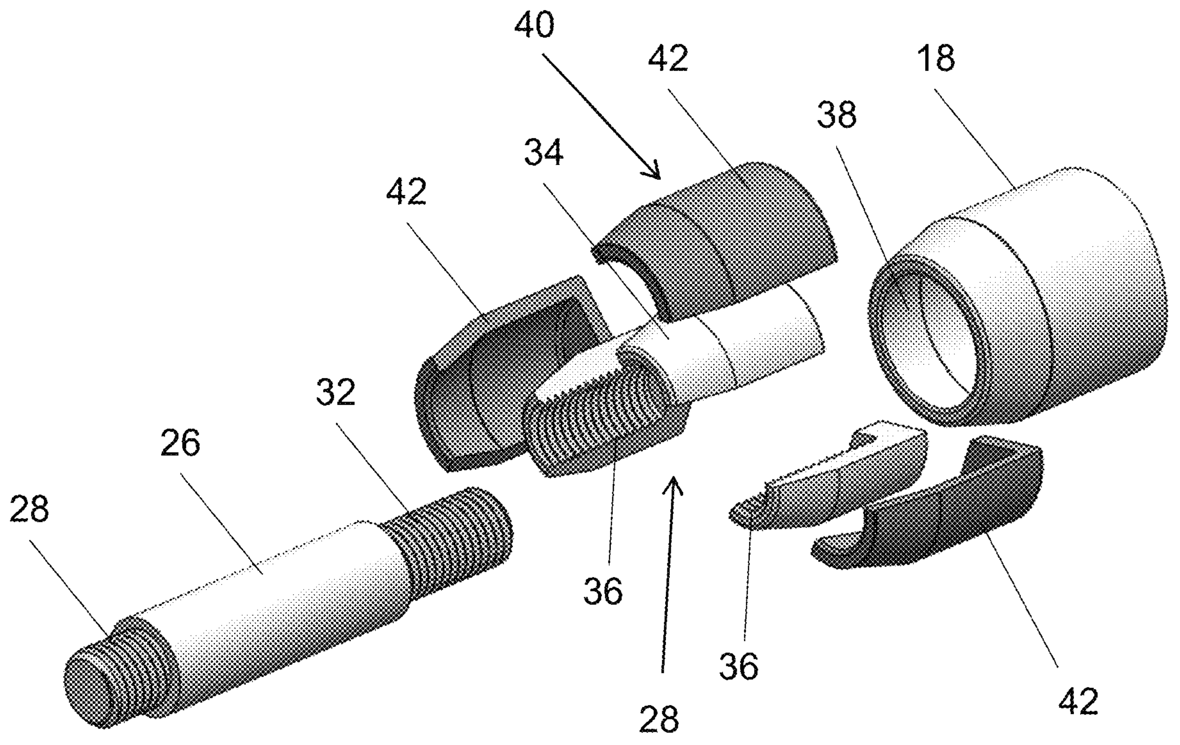
FIG. 4 shows an exploded view of a piston of the internal combustion engine shown in FIG. 1.

An exploded view of one of the pistons 14 is shown in FIG. 4 of the accompanying drawings.

As shown in FIG. 4, the piston rod 16 comprises a pushrod portion 26. The pushrod portion 26 is constructed from cast iron. However, it will be understood that the pushrod portion 26 may alternatively be constructed from any suitable material, such as steel, e.g. stainless steel or an austenitic nickel-chromium-based superalloy such as Inconel®. The pushrod portion 26 comprises a threaded portion 28 for coupling the pushrod portion 26 to conrod 30 (shown in FIG. 1) of the internal combustion engine 10. The pushrod portion 26 comprises a threaded portion 32 for coupling the pushrod portion 26 to a wedge portion 34 of the piston rod 16.

As shown in FIG. 4, the wedge portion 34 is constructed from cast iron. However, it will be understood that the wedge portion 34 may alternatively be constructed from any suitable material, such as steel, e.g. stainless steel or an austenitic nickel-chromium-based superalloy such as Inconel®. The wedge portion 34 comprise a plurality of segments. The segments each have a threaded portion 36 for engaging the threaded portion 32 of the pushrod portion 26. The threaded portions 32, 36 form a coupling arrangement between the pushrod portion 26 and the wedge portion 34.

As shown in FIG. 4, the piston crown 18 is coupled to, or forms an end portion of the piston 14. The piston crown 18 is configured for coupling to the piston rod 16. In the illustrated internal combustion engine 10, the piston crown 18 is coupled to the piston rod 16 by an interference fit. The piston crown 18 comprises a wedge portion 38 configured, e.g. shaped and/or sized, to complementarily engage the wedge portion 28 of the piston rod 16. The piston crown 18 is constructed from Silicon Nitride.

In use, the configuration of the piston 14 means that load forces exerted on the piston crown 18 by the combustion reaction (as shown by the arrow F1 in FIG. 3) place the piston crown 18 in compression. This ensures that the ceramic material of the piston crown 18 is in compression, eliminating a common failure mode of ceramic materials.

As shown in FIG. 4, the piston 14 comprises an insulation arrangement, generally denoted 40. The insulation arrangement 40 is interposed between the piston rod 16 and the piston crown 18.

In the illustrated internal combustion engine 10, the insulation arrangement 40 comprises a plurality of segments 42. The insulation arrangement 40 is constructed from a Zirconium oxide material such as Zirconia®.

As shown in FIG. 4, the insulation arrangement 40 is configured and/or arranged such that when disposed on the piston rod 16 axial slots or spaces are defined between the segments 42 of the insulation arrangement 40.

Beneficially, this allows for differential thermal expansion of components of the piston 14 while providing thermal insulation between the piston crown 18 and the piston rod 16.

Referring again to FIG. 3, a lubrication arrangement 44 is provided. In the illustrated internal combustion engine 10, the lubrication arrangement 44 taking the form of a solid lubricant embedded in a coating applied to the piston crowns 18.

Figure 5:
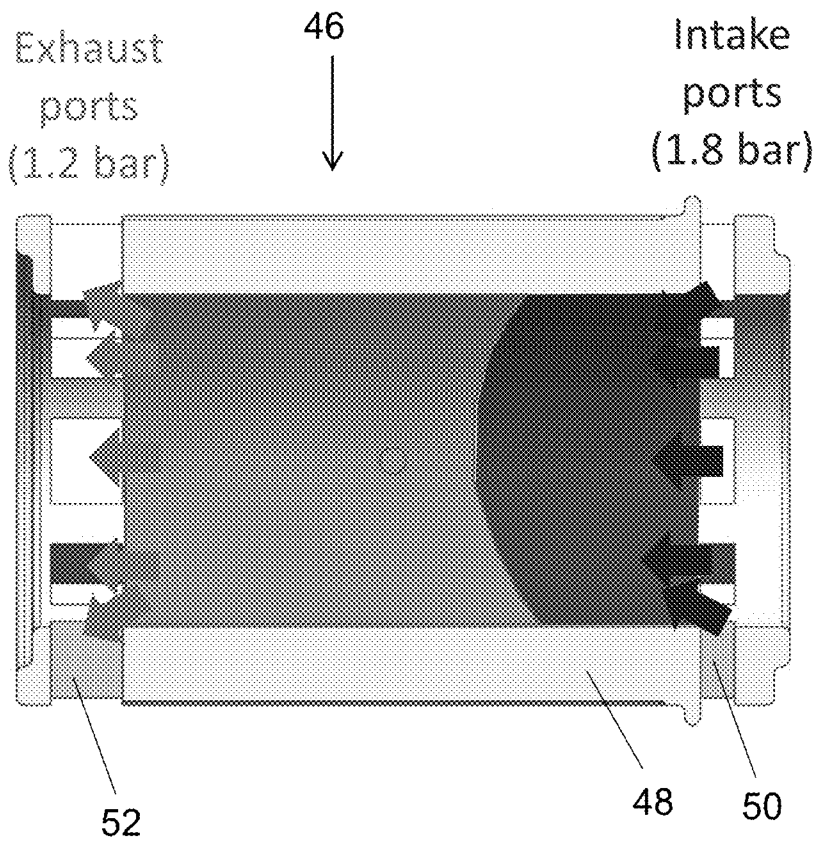
FIG. 5 shows an axial section view of the cylinder of the internal combustion engine shown in FIG. 1.
Figure 6:
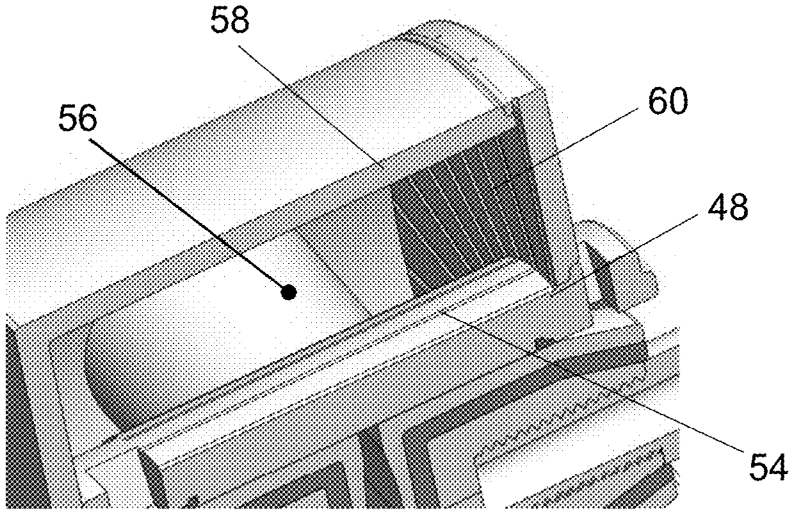
FIG. 6 shows an exhaust reservoir housing of the internal combustion engine shown in FIG. 1.

Referring again to FIG. 1 and now also to FIGS. 5 and 6 of the accompanying drawings, the internal combustion engine 10 comprises a cylinder arrangement, generally denoted 46, comprising a cylinder 48. In the illustrated internal combustion engine 10, the cylinder 48 is constructed from Silicon Nitride. The cylinder 48 comprises one or more inlet ports 50 and one or more exhaust ports 52.

As shown in FIG. 5, the internal combustion engine 10 comprises a gas scavenging arrangement, configured so that plug flow inlet charge air displaces combustion products with minimal mixing. In the illustrated internal combustion engine the gas scavenging arrangement comprises providing relatively large intake and/or exhaust total port flow areas.

Beneficially, the gas scavenging arrangement provides uniform circumferential heat flow into the cylinder 48 to minimise circumferential thermal gradients.

As shown in FIG. 6, one or more grooves 54 are formed or otherwise provided in the outer surface of the cylinder 48. The groove or grooves 54 comprise or take the form of micro-grooves. In the illustrated internal combustion engine 10, the grooves 54 are machined into the outer surface of the cylinder 48.

In use, hot exhaust gas, for example but not exclusively at a pressure of around 5 bar flows through the grooves 54 at high speed, maintaining the outer surface of the cylinder 48 at a relatively high temperature.

Beneficially, this decreases the thermal gradient between the inside and outside of the cylinder 48. As the cylinder 48 is constructed from a ceramic material, the decrease in thermal gradient between the inside and outside of the cylinder 48 mitigates a failure mode of ceramic materials.

As shown in FIG. 6, the internal combustion engine 10 comprises an exhaust reservoir 56 configured to receive exhaust from the combustion reaction. The exhaust reservoir 56 is disposed around an outer surface portion of the cylinder 48. The exhaust reservoir 56 may be defined by an exhaust reservoir housing 58.

As shown in FIG. 6, one or more grooves 60 are formed or otherwise provided in the inner surface of the exhaust reservoir housing 58. The grooves 60 comprise or take the form of micro-grooves. In the illustrated internal combustion engine 10, the grooves 60 are machined into the one or more inner surface of the exhaust reservoir housing 58, e.g. an axial end face of the exhaust reservoir housing 58.

In use, hot exhaust gas, for example but not exclusively at a pressure of around 5 Bar flows through the grooves 60 at high speed, maintaining the outer surface of the cylinder 48 at a relatively high temperature.

Beneficially, this decreases the thermal gradient between the inside and outside of the cylinder 48. Since the cylinder 48 is constructed from a ceramic material, the decrease in thermal gradient between the inside and outside of the cylinder 48 mitigates a failure mode of ceramic materials.

In use, exhaust ducts (not shown) transport combustion products from the exhaust reservoir 56 to an exhaust turbine inlet (not shown).

Figure 7:
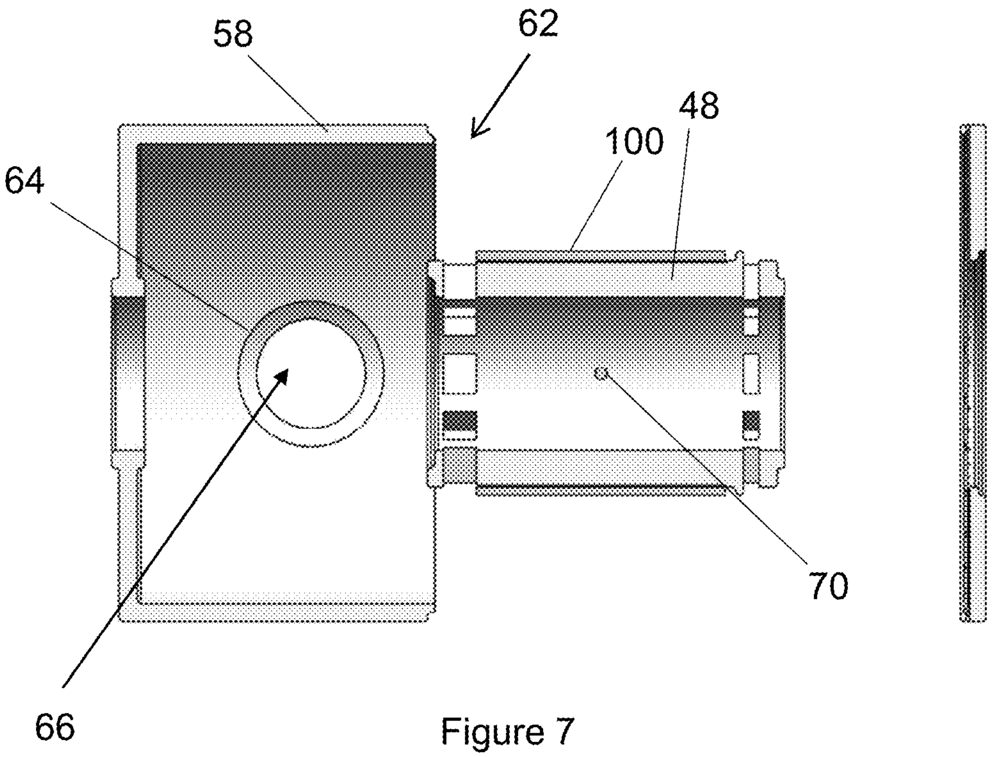
FIGS. 7 and 8 show a fuel injection arrangement of the internal combustion shown in FIG. 1.
Figure 8:
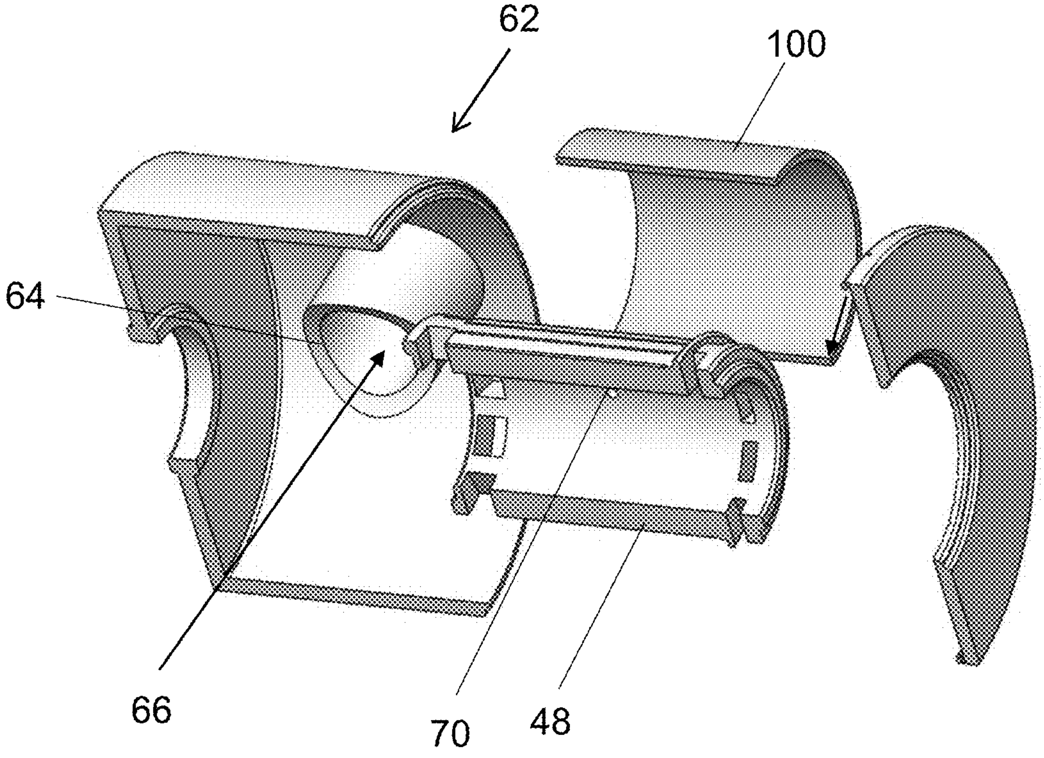

Referring now also to FIGS. 7 and 8 of the accompanying drawings, the exhaust reservoir housing 58 is modular in construction, the exhaust reservoir housing 58 being manufactured in two or more parts. Beneficially, this facilitates ease of manufacture.

Figure 9:
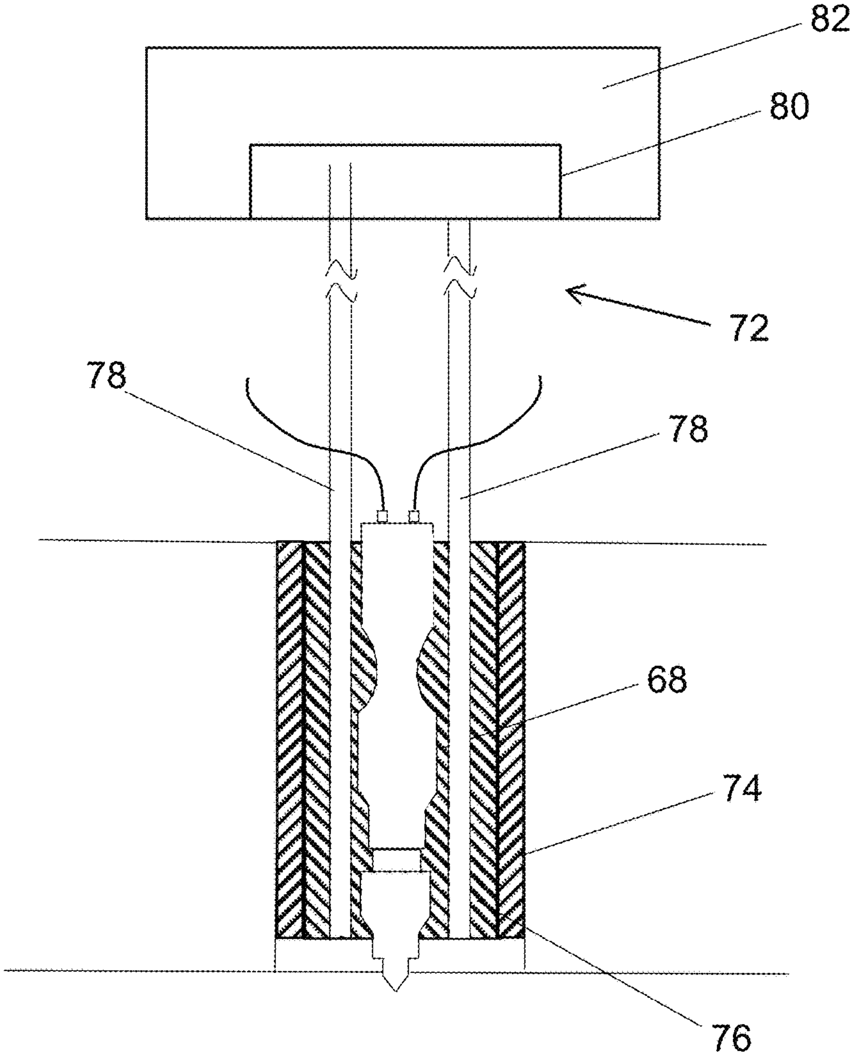
FIGS. 9, 10 and 11 show a cooling arrangement for the fuel injection arrangement shown in FIGS. 7 and 8.
Figure 10:
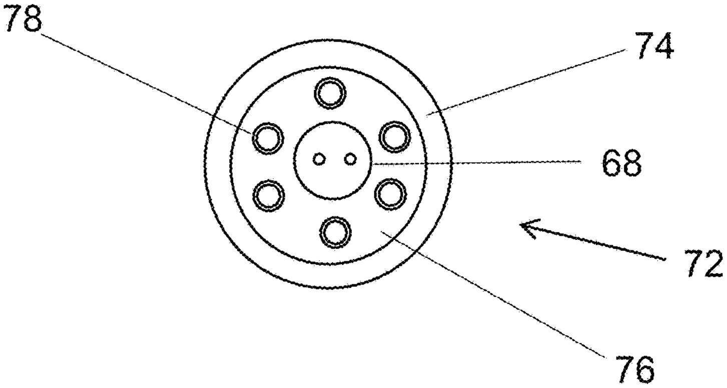
Figure 11:
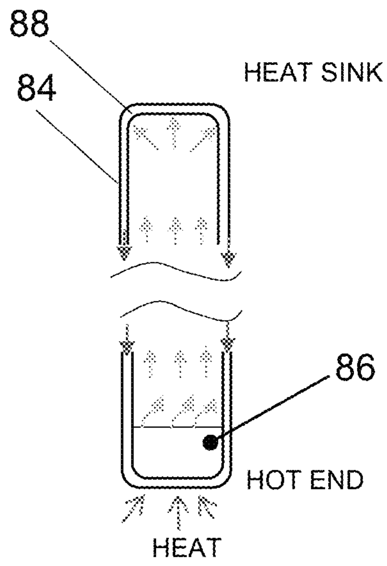

As shown in FIGS. 7 and 8, and referring now also to FIGS. 9, 10 and 11 of the accompanying drawings, the internal combustion engine 10 has a fuel injection arrangement, generally denoted 62, comprising a tubular boss portion 64 having a bore 66 for receiving a fuel injector 68 (shown in FIG. 9). The boss portion 64 extends radially inwards from a circumferential wall of the exhaust reservoir housing 58. A distal end portion of the boss portion 64 is shaped and dimensioned to engage the outer surface of the cylinder 48, such that the bore 66 surrounds and communicates with injector port 70 formed through the wall of the cylinder 48.

As shown in FIGS. 9 and 10, a cooling arrangement, generally denoted 72 is associated with the fuel injection arrangement 62. The cooling arrangement 72 comprises or takes the form of a heat pipe-type cooling arrangement, as described further below.

Beneficially, the cooling arrangement 72 ensures that the fuel injector 68 remains within maximum service temperature even when located in a wall of the cylinder 48 at high temperature, e.g. a temperature of around 1000 C.

As shown in FIGS. 9 and 10, a sleeve 74 is disposed within the bore 66. The sleeve 74 is constructed from a technical ceramic material, in particular a technical ceramic with low thermal conductivity. In the illustrated internal combustion engine 10, the sleeve 74 is constructed from Zirconia. A cylindrical block 76 is disposed within the sleeve 74. The cylindrical block 76 is constructed from a technical ceramic, in particular a technical ceramic with high thermal conductivity. In the illustrated internal combustion engine 10, the cylindrical block 76 is constructed from Aluminium Nitride.

As shown in FIGS. 9 and 10, the cooling arrangement 72 comprises heat pipes 78 arranged in parallel and which communicate with a heat sink 80. In the illustrated internal combustion engine 10, the heat pipes 78 are constructed from stainless steel.

The heat sink 80 is disposed in a charge volume, generally denoted 82, which is cooled. As shown, the heat pipes 78 have a length greater than the fuel injector 68, with the heat pipes 78 extending from at or near a tip of the fuel injector 68 and past the head of the fuel injector 68.

As shown in FIG. 11, the heat pipes 78 comprise an envelope 84, a saturated working fluid 86 and a wick 88. The working fluid 86 comprises or takes the form of a liquid at ambient temperature. In the illustrated internal combustion engine 10, the working fluid comprises sodium.

In use, when the end of the fuel injector 68 heats up and the temperature of the working fluid 86 exceeds its boiling point, the working fluid 86 will vaporise and travel up the heat pipes 68 towards the heat sink 80 where it will condense and be returned to the hot end via the wick 88 through capillary pressure. Beneficially, the cooling arrangement 72 conducts heat from the fuel injector 68, due to the latent heat of vaporisation.

Beneficially, this ensures that the fuel injectors remain within maximum service temperature even when located in a wall of a cylinder 48 at high temperature, e.g. a temperature of around 1000 C.

Referring again to FIG. 1, the illustrated internal combustion engine 10 comprises one or more crank 90 (two cranks 90 are shown in FIG. 1), the pistons 14 coupled to the cranks 90.

In the illustrated internal combustion engine 10, a metal frame 92 is provided to react axial combustion and/or inertial loads and/or side loads from the cranks 90. Sleeve bearings 94 are provided to react side loads from the cranks 90.

As shown in FIGS. 1, 2 and 3, the internal combustion engine 10 further comprises collars 96 and insulating collars 98. The collars 96 are constructed from a ceramic material, namely Silicon Nitride. The insulating collars 98 are constructed from a ceramic insulation material, namely Zirconium oxide.

In the illustrated internal combustion engine 10, the internal combustion engine 10 further comprises non-structural insulation 100. The insulation 100 is provided between the outside of the cylinder 48 and the exhaust reservoir housing 58 and around the outside of the exhaust reservoir housing 58.

Figure 12:
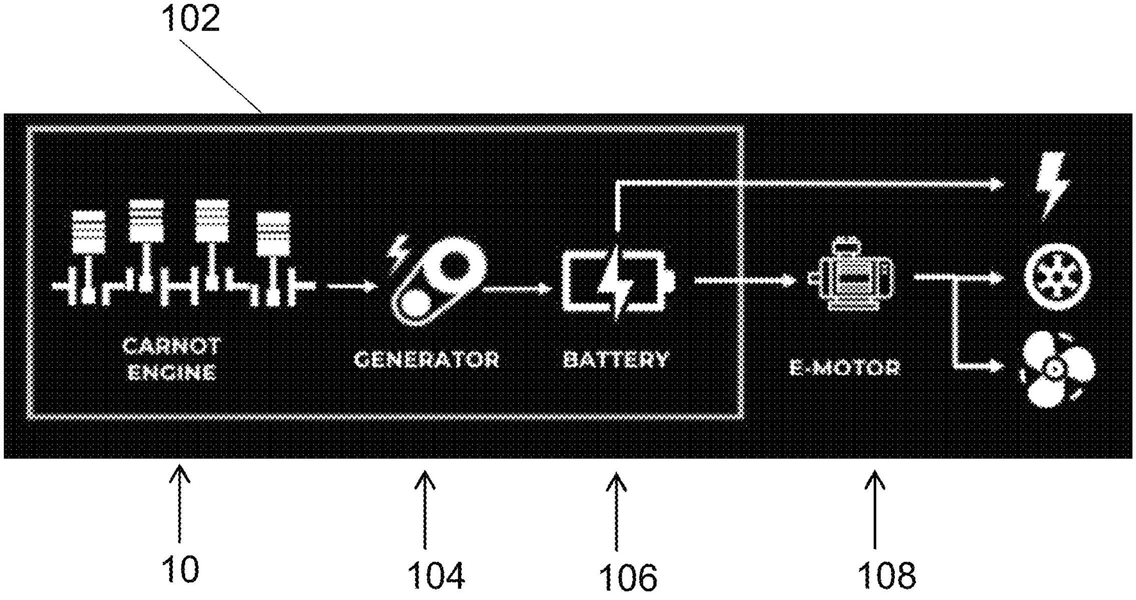
FIG. 12 shows a generator set comprising the internal combustion engine.

FIG. 12 of the accompanying drawings shows a generator set 102 comprising the internal combustion engine 10.

As shown in FIG. 12, the generator set 102 comprises a generator 104 coupled to the internal combustion engine 10. The generator 104 converts the mechanical energy output from the internal combustion engine 10 into electrical energy. The generator set 102 comprises a power source 106, which in the illustrated generator set 102 takes the form of a rechargeable battery, coupled to the generator 104. The generator 104 supplies the electrical energy to charge the power source 106.

As shown in FIG. 12, the generator set 102 is coupled to an electric motor 108. The motor 108 is coupled to the power source 106. The power source 106 supplies the electrical energy to drive the motor 108. As shown, the power source 106 may supply the electrical energy to another component or system, for example but not exclusively the electrical system of a vehicle (not shown).

In use, the internal combustion engine 10 will run at constant load/speed and peak efficiency. The generator set 102 can provide power either directly to an appliance, for example for static generator set applications, to electric motors to provide propulsion for transport applications, and/or an auxiliary propulsion unit (APU), e.g. a marine APU or heavy good vehicle (HGV) APU.

In use, surplus power can be stored in the power source, e.g. battery. Once the power source, e.g. battery, charges, the internal combustion engine can cut out for all-electric operation until the battery discharges and the cycle repeats.

The generator sets can be self-contained 100 kW and 300 kW power modules housed in thermally- and acoustically-insulating casings. The power modules are scalable, with multi-module power plants being used to meet the specific power requirements of end users.

It will be understood that various modifications may be made without departing from the scope of the claimed invention.

Figure 13:
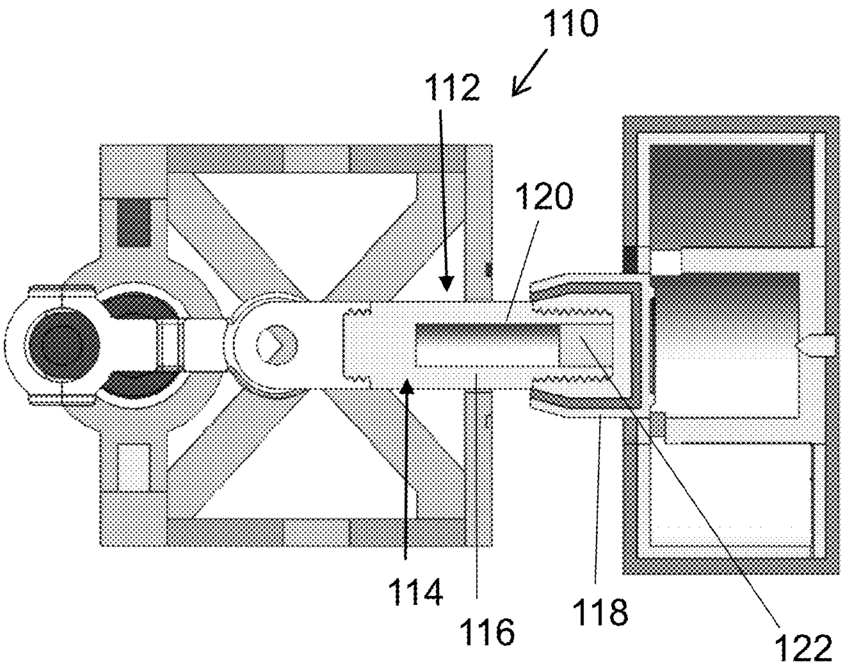
FIGS. 13 and 14 show diagrammatic views of an alternative internal combustion engine according to the present disclosure, with a piston at its bottom dead centre position and top dead centre position respectively.
Figure 14:
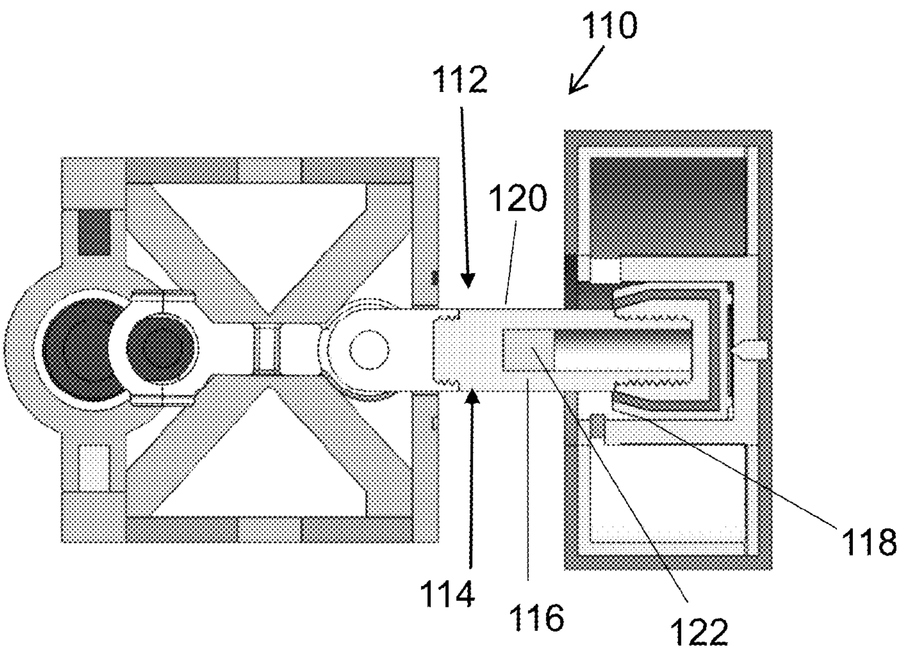

For example, while the internal combustion engine 10 shows an opposed piston and cylinder arrangement, FIGS. 13 and 14 show an alternative internal combustion engine 110 having another, non-opposed, piston and cylinder arrangement.

As shown in FIGS. 13 and 14, the internal combustion engine 110 comprises a piston arrangement, generally denoted 112, comprising a piston 114. The piston 114 comprises a piston rod 116 and a piston crown 118.

The piston rod 116 comprises an axially disposed bore 120 formed therein. A heat transfer member 122 is configured for location in the bore 120 of the piston rod 116. The heat transfer member 122 is reconfigurable from a first, solid, state to a second state in which at least part of the heat transfer member 122 is in a liquid state, the heat transfer member 122 in said second state being movable relative to the bore 120 so as to transfer heat away from and thus cool the piston rod 116 as the piston 114 reciprocates.

In use, the piston rod 116 will heat up during operation of the internal combustion engine 110. When the temperature of at least part of the heat transfer member 122 exceeds a preselected temperature threshold, e.g. the melting temperature of the heat transfer member 122, at least part of, and in particular embodiments all or a substantial part of, the heat transfer member 122 is reconfigured from the first, solid, state to the second, liquid, state. Reconfiguration of the heat transfer member 122 permits the heat transfer member 122 to move within the respective bore 120 and thus transport heat away from the hot piston end as the piston 114 reciprocates between the bottom dead centre (BDC) position and top dead centre (TDC) position.

In the illustrated piston arrangement 112, the heat transfer member 122 is formed from sodium. The heat transfer member 122 takes the form of a cylindrical member or substantially cylindrical member, the dimensions and/or shape of the heat transfer member 122 selected to facilitate location of the heat transfer member 122 in the bore 120 of the piston rod 116. However, it will be recognised that the heat transfer member 122 may be any suitable shape and/or size to complement the bore 120. The heat transfer member 122 may comprise or take the form of a slug of material.

In the illustrated piston arrangement 112, the piston rod 116 is constructed from cast iron. However, it will be understood that the piston rod 116 may alternatively be constructed from any other suitable material such as steel, e.g. stainless steel or an austenitic nickel-chromium-based superalloy such as Inconel®.

Figure 15:
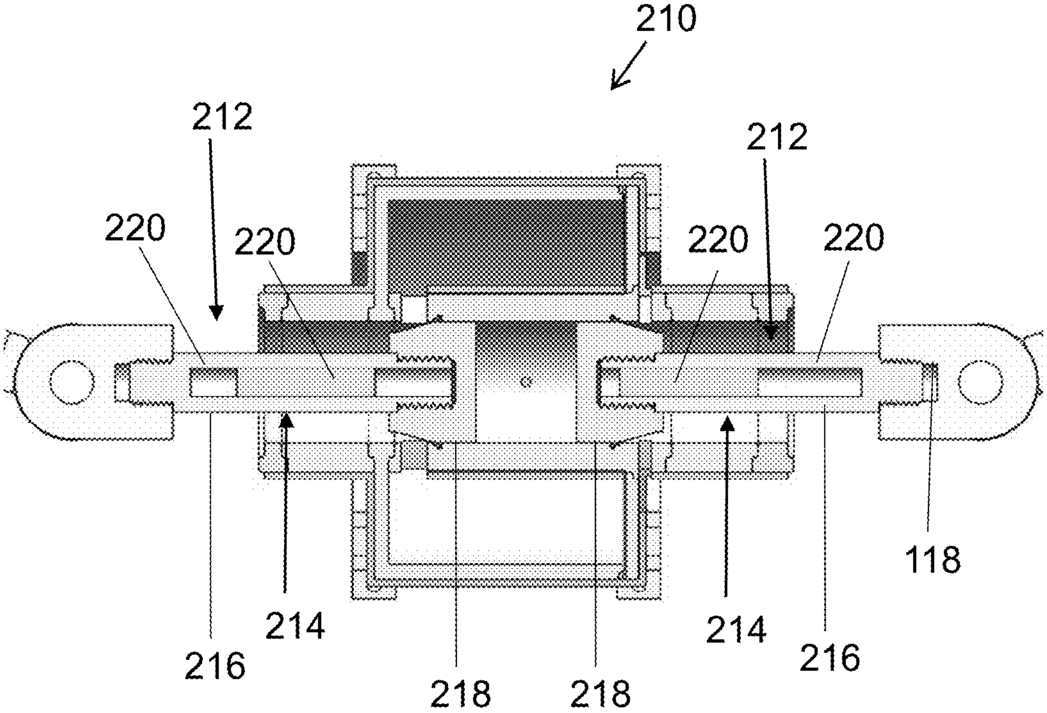
FIG. 15 shows a diagrammatic view of an alternative internal combustion engine according to the present disclosure.

Referring now to FIG. 15, there is shown an alternative internal combustion engine 210. The internal combustion engine 210 is similar to the internal combustion engine 10 with like reference signed incremented by 200.

As shown in FIG. 15, the internal combustion engine 210 comprises a piston arrangement, generally denoted 212, comprising a number of pistons 214 (two pistons are shown in FIG. 12). Each of the pistons 214 comprises a piston rod 216 and a piston crown 218.

As shown in FIG. 15, the piston rods 216 each comprise an axially disposed bore 220 formed therein. Heat transfer members 222 are configured for location in the bores 220 of the piston rods 216. The heat transfer members 222 are reconfigurable from a first, solid, state to a second state in which at least part of the heat transfer members 222 is in a liquid state, the heat transfer members 222 in said second state being movable relative to their respective bore 220 so as to transfer heat away from and thus cool the piston rod 216 as the pistons 214 reciprocate.

In use, the piston rods 216 will heat up during operation of the internal combustion engine 10. When the temperature of at least part of the heat transfer members 222 exceeds a preselected temperature threshold, e.g. the melting temperature of the heat transfer members 222, at least part of, and in particular embodiments all or a substantial part of, the heat transfer member 222 are reconfigured from the first, solid, state to the second, liquid, state. Reconfiguration of the heat transfer members 222 permits the heat transfer members 222 to move within the respective bores 220 and thus transport heat away from the hot piston end as the pistons 214 reciprocate between their bottom dead centre (BDC) position and their top dead centre (TDC) position.

In the illustrated piston arrangement 212, the heat transfer members 222 are formed from sodium. The heat transfer members 222 take the form of cylindrical members or substantially cylindrical members, the dimensions and/or shape of the heat transfers members 222 selected to facilitate location of the heat transfer members 222 in the bores 220 of the piston rods 216. However, it will be recognised that the heat transfer members 222 may be any suitable shape and/or size to complement the bores 220. The heat transfer members 222 may comprise or take the form of a slug of material.

While in the internal combustion engine 10 the pistons are modular in construction and are at least partially constructed from a technical ceramic, in the internal combustion engine 210, the pistons 214 are each a unitary construction and are constructed from Inconel® or stainless steel.

As described above, various modifications may be made without departing from the scope of the claimed invention.

For example, FIGS. 16 to 32 of the accompanying drawings show a number of different pistons 314,414,514,614, 714 according to the present disclosure.

Figure 16:
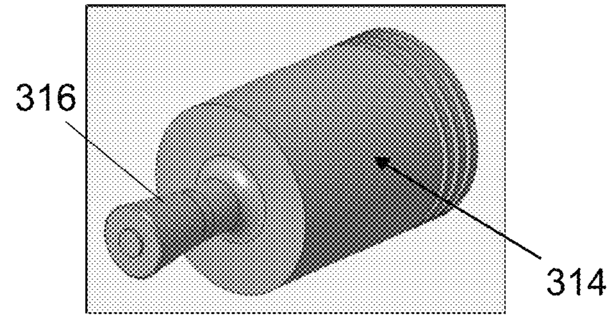
FIGS. 16 to 32 show a number of different pistons for use in the piston arrangements of the present disclosure.
Figure 17:
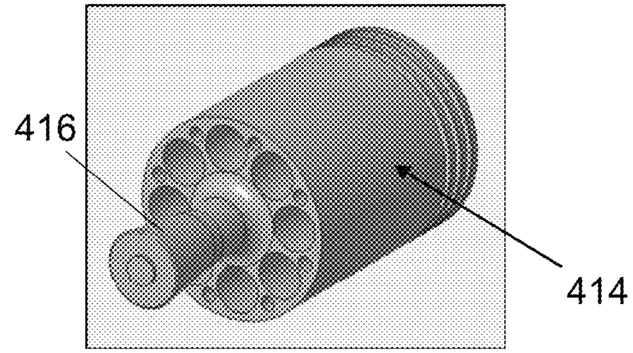
Figure 18:
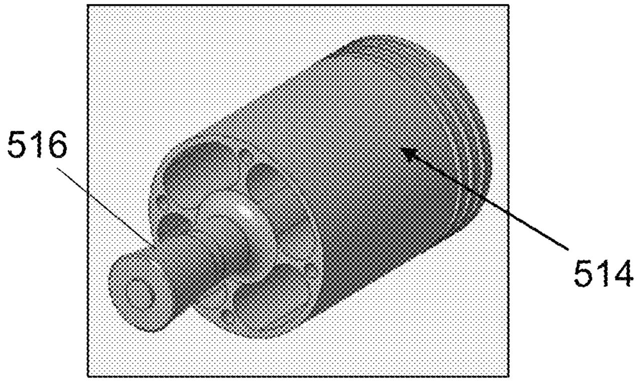
Figure 19:
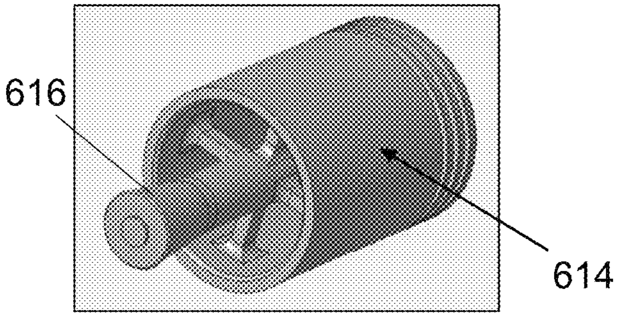
Figure 20:
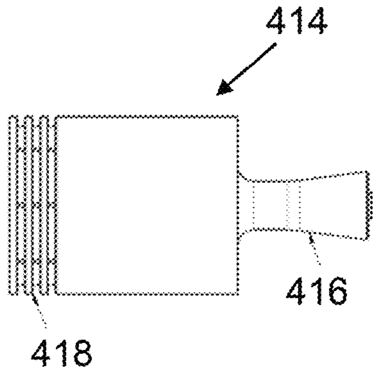
Figure 21:
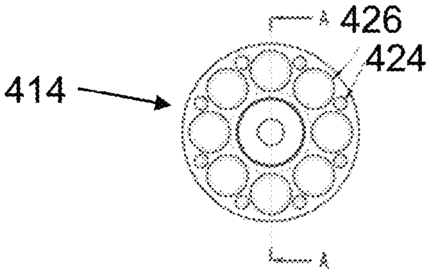

The piston 314 shown in FIG. 16 is a solid piston. Beneficially, the provision of a solid piston facilitates ease of manufacture.

FIGS. 17 and 20 to 23 show an alternative piston 414 to that shown in FIG. 16. As shown, the piston 414 comprises a plurality of axial bores 424, 426, which in the illustrated piston 414 are formed by drilling, in the piston crown 418.

Beneficially, the provision of a piston which comprises one or more bores 424,426 results in a reduction in the mass of the piston 414. This, in turn, results in a reduction of the reciprocating mass within the internal combustion engine, which given that the engine may be running at a high rotational speed, for example but not exclusively 3000 rpm to 7000 rpm, reduces the inertial load and thus significantly improves the working life of the piston arrangement.

Figure 22:
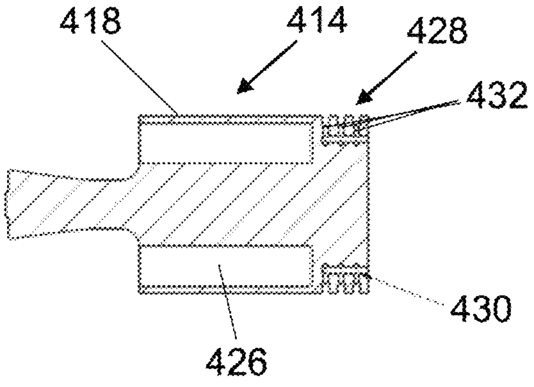
Figure 23:
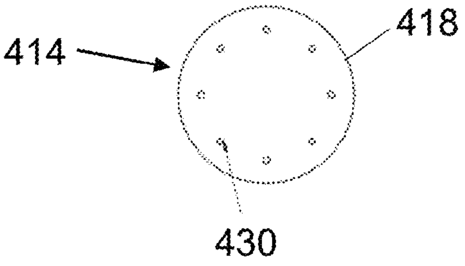
Figure 24:
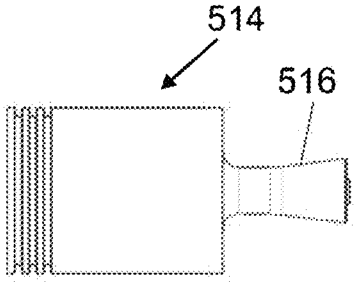
Figure 25:
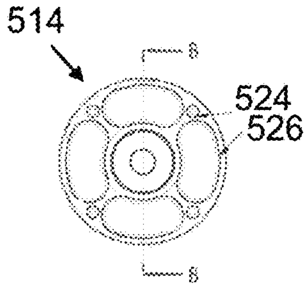
Figure 26:
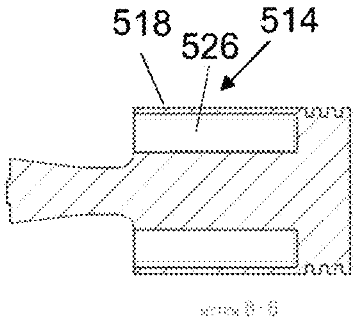
Figure 27:
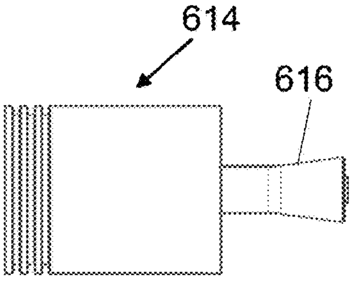
Figure 28:
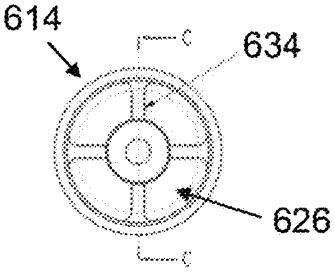
Figure 29:
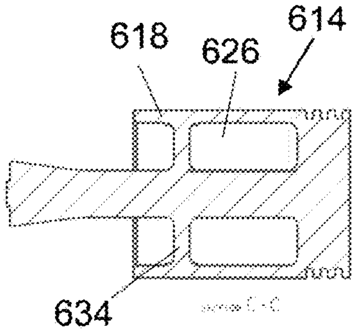

As shown in FIG. 22, the piston 414 further comprises a fluid communication arrangement, general denoted 428. The fluid communication arrangement 428 comprises axial bores 430 formed or otherwise provided, e.g. by a drilling and/or milling process, in the piston crown 418 and radial bores 432 (three radial bores 432 are shown in FIG. 22) formed or otherwise provided, e.g. by a drilling and/or milling process, in the piston crown 418. The radial bores 432 communicate with the one or more axial bores in the piston crown 418.

In use, the fluid communication arrangement 428 facilitates fluid communication to urge one or more seal elements, e.g. piston rings, mounted on the piston crown 418 against the cylinder bore during running.

Beneficially, this acts to energise and/or provide additional energisation of the seal elements, e.g. piston rings, against the cylinder.

FIGS. 18 and 24 to 26 show an alternative piston 514 to that shown in FIG. 16. As shown, the piston 514 comprises a plurality of bores 524 and a plurality of part-annular pockets 526 formed in piston crown 518, which in the illustrated piston 514 are formed by milling.

FIGS. 19 and 27 to 29 show a further alternative piston 614 to that shown in FIG. 16. As shown, the piston 614 has a cavity 626 formed in the piston crown 618. A number of radial struts 634 provide structural support. The piston 614 is formed by a casting process, e.g. a lost core casing process, or injection moulding.

Figure 30:
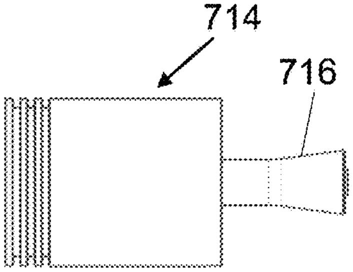
Figure 31:
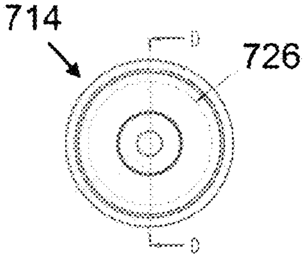
Figure 32:
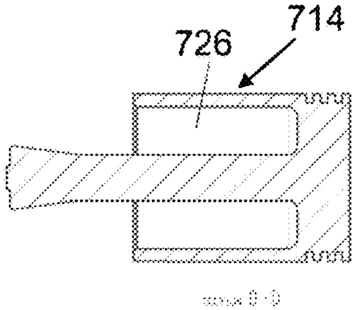

FIGS. 30 to 32 show a further alternative piston 714 to that shown in FIG. 16. As shown, the piston 714 has a cavity 726 formed in the piston crown 718. The piston 714 is formed by a casting process, e.g. a lost core casing process or injection moulding.

It will be understood that the pistons may alternatively or additionally be manufactured using an additive manufacturing process such as 3D printing.

In each of the pistons 314, 414, 514, 614, 714 shown in FIGS. 16 to 32, the piston rods 316, 416, 516, 616, 716 are tapered, i.e. a distal end portion of the piston rod 316, 416, 516, 616, 716 defines a greater outer dimension e.g. diameter, that a proximal end portion of the piston rod 316, 416, 516, 616, 716.

As described above, various modifications may be made without departing from the scope of the claimed invention.

Figure 33:
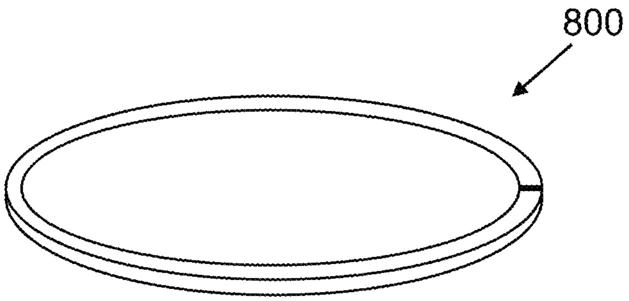
FIGS. 33 and 34 show a piston sealing element according to an example of the present disclosure.
Figure 34:
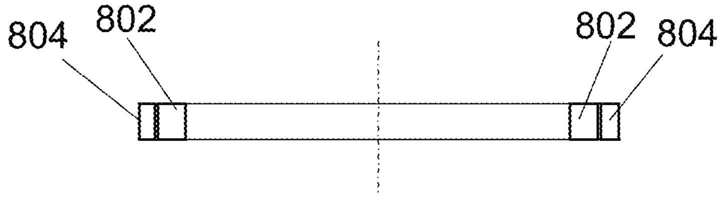

FIGS. 33 and 34 of the accompanying drawings show a piston sealing element 800 according to the present disclosure, which in the illustrated example takes the form of a piston ring. As shown, the piston sealing element 800 comprises a first component 802 and a second component 804. The first component 802 comprises or takes the form of a first technical ceramic material, which in the illustrated sealing element 800 is Silicon Nitride. The second component 804 is embedded on an outer surface of the first component 802. The second component 80 comprises or takes the form of a second, different, technical ceramic material, which in the illustrated sealing element 800 is Titanium Nitride.

The invention claimed is:

1. A piston arrangement for an internal combustion engine, the piston arrangement comprising:

a plurality of pistons, wherein the pistons are arranged in an opposed configuration, and wherein a piston crown of one or more of said pistons is wholly or substantially wholly constructed from a technical ceramic material, wherein at least one the pistons comprises an insulation arrangement interposed between a piston rod and the piston crown of the respective, and wherein the insulation arrangement comprises a plurality of segments, and wherein the insulation arrangement is configured such that when disposed on piston rod axial slots or spaces are defined between the segments of the insulation arrangement.

2. The piston arrangement of claim 1, wherein at least one of the pistons is at least partially constructed from a metallic material.

3. The piston arrangement of claim 2, wherein from the metallic material comprises at least one of:

cast iron;

steel; or an austenitic nickel-chromium-based superalloy.

4. The piston arrangement of claim 1, wherein the pistons each comprise a piston rod.

5. The piston arrangement of claim 4, wherein the piston rod of at least one of the pistons comprises an axially disposed bore formed therein and a heat transfer member is configured for location in the bore of the piston rod, wherein the heat transfer member is reconfigurable from a first, solid, state to a second state in which at least part of the heat transfer member is in a liquid state, the heat transfer member in said second state being movable relative to the bore of the piston rod so as to transfer heat away from and thus cool the piston rod as the piston reciprocates.

6. The piston arrangement of claim 5, wherein the heat transfer member is formed from a metallic material.

7. The piston arrangement of claim 6, wherein the heat transfer member is formed from sodium.

8. The piston arrangement of claim 4, wherein the piston rod of at least one of the pistons comprises:

a pushrod portion; and a wedge portion, wherein the wedge portion of the piston rod comprises a plurality of segments.

9. The piston arrangement of claim 1, wherein one or more of the pistons comprises a fluid communication arrangement, wherein the fluid communication arrangement comprises one or more axial bores and one or more radial bores, the radial bores communicating with the one or more axial bores.

10. A piston and cylinder assembly for an internal combustion engine, the piston and cylinder assembly comprising:

the piston arrangement of claim 1; and a cylinder arrangement comprising cylinders for receiving the pistons of the piston arrangement.

11. The piston and cylinder assembly of claim 10, wherein one or more grooves are formed or otherwise provided in an outer surface of at least one of the cylinders.

12. The piston and cylinder assembly of claim 11, wherein at least one of the grooves comprises a micro-groove having a width in a range of 1 micron to 100 mm.

13. An internal combustion engine comprising the piston and cylinder arrangement of claim 10.

14. The internal combustion engine of claim 13, comprising an exhaust reservoir housing, the exhaust reservoir housing defining an exhaust reservoir, wherein one or more grooves are formed or otherwise provided in an inner surface of the exhaust reservoir housing.

15. The internal combustion engine of claim 13, comprising a cooling arrangement for a fuel injection arrangement of the internal combustion engine, wherein the cooling arrangement comprises one or more heat pipes.

16. The internal combustion engine of claim 15, wherein at least one of:

one or more of the heat pipes are coupled to or operatively associated with a heat sink;

one of the heat pipes comprises: an envelope; a saturated working fluid; and a wick.

17. A generator set comprising the internal combustion engine of claim 13.

18. The piston and cylinder assembly of claim 10, wherein the cylinder arrangement is at least partially constructed from the technical ceramic material.

19. The piston and cylinder assembly of claim 18, wherein the technical ceramic material comprises a silicon-based technical ceramic material.

20. The piston and cylinder assembly of claim 18, wherein the technical ceramic material comprises Silicon Nitride.

21. The piston and cylinder assembly of claim 10, comprising a gas scavenging arrangement operatively associated with the cylinder arrangement.

22. The piston arrangement of claim 1, wherein the technical ceramic is a silicon-based technical ceramic.

23. The piston arrangement of claim 22, wherein the silicon-based technical ceramic comprises Silicon Nitride.

24. The piston arrangement of claim 1, wherein the insulation arrangement is constructed from the technical ceramic material.

25. The piston arrangement of claim 24, wherein the insulation arrangement is constructed from a Zirconium oxide material.

26. The piston arrangement of claim 1, wherein at least one of the pistons comprises one or more seal elements constructed from a technical ceramic material.

27. The piston arrangement of claim 26, wherein one or more of the seal elements are constructed from a plurality of technical ceramic material components, wherein the plurality of technical ceramic components comprises a first component and a second component.

28. The piston arrangement of claim 27, wherein at least one of:

the first component comprises a silicon-based technical ceramic material; and the second component comprises a Titanium-based technical ceramic material.

29. The piston arrangement of claim 27, wherein at least one of:

the first component comprises Silicon Nitride;

the second component comprises Titanium Nitride.

30. A piston arrangement for an internal combustion engine, the piston arrangement comprising:

a plurality of pistons, wherein the pistons are arranged in an opposed configuration, wherein a piston crown of one or more of said pistons is wholly constructed from a technical ceramic material, wherein the pistons each comprise a piston rod, and wherein the piston rod of at least one of the pistons comprises an axially disposed bore formed therein and a heat transfer member is configured for location in the bore of the piston rod, wherein the heat transfer member is reconfigurable from a first, solid, state to a second state in which at least part of the heat transfer member is in a liquid state, the heat transfer member in said second state being movable relative to the bore of the piston rod so as to transfer heat away from and thus cool the piston rod as the piston reciprocates.

31. The piston arrangement of claim 30, wherein the heat transfer member is formed from a metallic material.

32. The piston arrangement of claim 31, wherein the heat transfer member is formed from sodium.

33. A piston arrangement for an internal combustion engine, the piston arrangement comprising:

a plurality of pistons, wherein the pistons are arranged in an opposed configuration, wherein a piston crown of one or more of said pistons is wholly constructed from a technical ceramic material, wherein the pistons each comprise a piston rod, and wherein the piston rod of at least one of the pistons comprises:

a pushrod portion; and a wedge portion, wherein the wedge portion of the piston rod comprises a plurality of segments.

34. An internal combustion engine comprising:

a piston and cylinder arrangement, the piston and cylinder arrangement comprising:

a piston arrangement comprising:

a plurality of pistons, wherein the pistons are arranged in an opposed configuration, and wherein a piston crown of one or more of said pistons is wholly constructed from a technical ceramic material;

a cylinder arrangement comprising cylinders for receiving the pistons; and a cooling arrangement for a fuel injection arrangement of the internal combustion engine, wherein the cooling arrangement comprises one or more heat pipes, and wherein at least one of:

one or more of the heat pipes are coupled to or operatively associated with a heat sink;

one of the heat pipes comprises: an envelope; a saturated working fluid;

and a wick.

* * * * *